United States Patent
Oh

(10) Patent No.: US 12,451,174 B2
(45) Date of Patent: Oct. 21, 2025

(54) SEMICONDUCTOR DEVICES CAPABLE OF PERFORMING WRITE TRAINING WITHOUT READ TRAINING, AND MEMORY SYSTEM INCLUDING THE SAME

(71) Applicant: Samsung Electronics Co., Ltd., Suwon-si (KR)

(72) Inventor: Taeyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 18/160,597

(22) Filed: Jan. 27, 2023

(65) Prior Publication Data

US 2023/0326504 A1    Oct. 12, 2023

(30) Foreign Application Priority Data

Apr. 6, 2022  (KR) .......... 10-2022-0042661
Jul. 21, 2022  (KR) .......... 10-2022-0090122

(51) Int. Cl.
  *G11C 16/04*   (2006.01)
  *G11C 7/10*    (2006.01)
  *G11C 7/22*    (2006.01)

(52) U.S. Cl.
  CPC .............. *G11C 7/222* (2013.01); *G11C 7/109* (2013.01)

(58) Field of Classification Search
  CPC ................................ G11C 7/222; G11C 7/109
  See application file for complete search history.

(56) References Cited

U.S. PATENT DOCUMENTS

| | | | |
|---|---|---|---|
| 8,300,482 B2 | 10/2012 | Bae | |
| 8,593,901 B2 | 11/2013 | Oh et al. | |
| 8,847,645 B1 | 9/2014 | Byeon | |
| 9,811,273 B1 | 11/2017 | Brahmadathan | |
| 10,659,215 B1 | 5/2020 | Wang et al. | |
| 11,016,663 B2 | 5/2021 | Wang | |
| 11,120,863 B2 * | 9/2021 | Aquil | G11C 11/4076 |
| 2007/0283297 A1 | 12/2007 | Hein et al. | |
| 2017/0243628 A1 * | 8/2017 | Chen | G11C 7/225 |
| 2017/0345480 A1 * | 11/2017 | Chen | G11C 11/4094 |
| 2020/0286535 A1 | 9/2020 | Hwang | |
| 2021/0241815 A1 | 8/2021 | Park | |

FOREIGN PATENT DOCUMENTS

| | | |
|---|---|---|
| KR | 20070115715 A | 12/2007 |
| KR | 100942953 B1 | 2/2010 |
| KR | 20190132055 A | 11/2019 |
| KR | 102059467 B1 | 12/2019 |
| KR | 20210099675 A | 8/2021 |

* cited by examiner

*Primary Examiner* — Pho M Luu
(74) *Attorney, Agent, or Firm* — Wolf, Greenfield & Sacks, P.C.

(57) ABSTRACT

A semiconductor device includes an input/output interface with a first data input/output pin, a plurality of second data input/output pins, and a write clock signal pin, which is configured to receive a write clock signal from a memory controller. The first data input/output pin is configured to receive write training data from the memory controller during a write training operation, and the plurality of second data input/output pins feed result values of the write training to the memory controller. This write training is performed by the semiconductor device using the write clock signal and the write training data.

17 Claims, 17 Drawing Sheets

SEMICONDUCTOR DEVICES CAPABLE OF PERFORMING WRITE TRAINING WITHOUT READ TRAINING, AND MEMORY SYSTEM INCLUDING THE SAME

CROSS-REFERENCE TO RELATED APPLICATIONS

This application is based on and claims priority under 35 U.S.C. § 119 to Korean Patent Application Nos. 10-2022-0042661 filed on Apr. 6, 2022, and 10-2022-0090122 filed on Jul. 21, 2022, in the Korean Intellectual Property Office, the disclosures of which are incorporated by reference herein in their entireties.

BACKGROUND

Embodiments of the present disclosure described herein relate to a semiconductor device that can perform write training, and more particularly, to a semiconductor device capable of performing write training without previously performing read training, and a memory system including the same.

Prior to low-power double data rate 4 (LPDDR4) or a double data rate 5 (DDR5), a memory device required additional circuits (e.g., one or more matching delay units and buffers) for compensating a delay of data due to a write clock tree (e.g., for compensating for a write clock-to-data offset tWCK2DQI). As such, a host (e.g., a processor or a memory controller) that outputs data to a memory device had to delay data to be transmitted to the memory device. However, because one or more additional circuits cause signal distortion, in LPDDR4 and DDR5, each of data signals transmitted from the host are sampled as received by the memory device (i.e., unmatched input/output (I/O) scheme). In this unmatched I/O scheme, a write training of a memory device needs to be performed in order to determine a correct delay time for each data signal to be transmitted by the host to the memory device.

However, to perform the write training on the memory device, a read operation needs to be performed in advance to check whether data is accurately written in the memory device. Additionally, a read training needs be performed prior to the write training for the purpose of performing the write training on the memory device. That is, only after the read training of the memory device is performed in advance, the write training for the memory device can be performed. According to one or more embodiments of the disclosure, there is provided a semiconductor memory device configured to perform asynchronous writing training without performing read training prior to the write training.

SUMMARY

Embodiments of the present disclosure provide a semiconductor device that is capable of performing write training without a read operation, by performing the write training without read training and feeding back result values of the write training to a memory controller asynchronously, and a memory system including the same.

According to an embodiment, an input/output interface of a semiconductor device includes data input/output pins, such as a first data input/output pin and a plurality of second data input/output pins, and a write clock signal pin that receives a write clock signal from a memory controller. The first data input/output pin receives write training data for write training from the memory controller. The plurality of second data input/output pins feed result values of the write training, which is performed using the write clock signal and the write training data, back to the memory controller.

The input/output interface further includes a sampling circuit that generates sampling values by sampling a write training pattern, which is included within the write training data, using sampling write clock signals that correspond to last M toggling edges of the write clock signal toggling N times and generates the result values of the write training. The sampling circuit feeds the result values of the write training back to the memory controller through the plurality of second data input/output pins while the write clock signal does not toggle.

According to an embodiment, a memory device includes a first data input/output pin that receives write training data for write training, a second data input/output pin, a third data input/output pin, a write clock signal pin that receives a write clock signal, and an input/output interface that sends result values of the write training performed by using the write clock signal and the write training data to the second data input/output pin and the third data input/output pin.

According to an embodiment, a memory system includes a memory device, and a memory controller that sends a write clock signal and write training data for write training to the memory device. The memory device includes a first data input/output pin that receives the write training data, a second data input/output pin, a third data input/output pin, a write clock signal pin that receives the write clock signal, and an input/output interface that feeds result values of the write training performed by using the write clock signal and the write training data back to the memory controller through the second data input/output pin and the third data input/output pin.

In addition, the input/output interface generates sampling values by sampling the write training data using sampling write clock signals associated write clock signal, generates a first detection signal indicating whether the write training data are received before a scheduled time and a second detection signal indicating whether the write training data are received on schedule (using the sampling values), feeds a logical OR result of the first detection signal and the second detection signal back to the memory controller through the second data input/output pin, and feeds the second detection signal back to the memory controller through the third data input/output pin.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
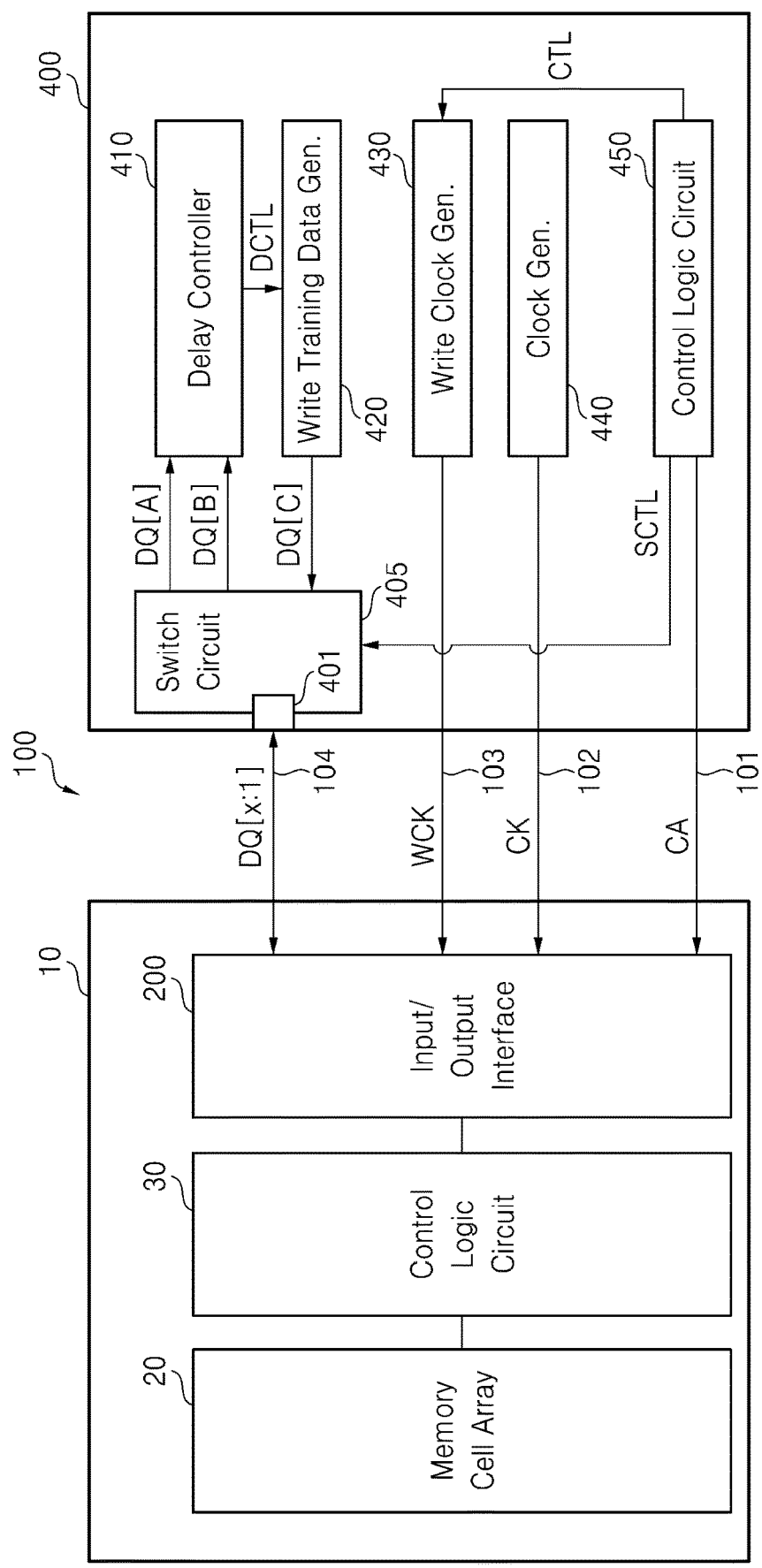
FIG. 1 is a block diagram of a memory system including a memory device and a memory controller according to an embodiment of the present disclosure.
Figure 2:
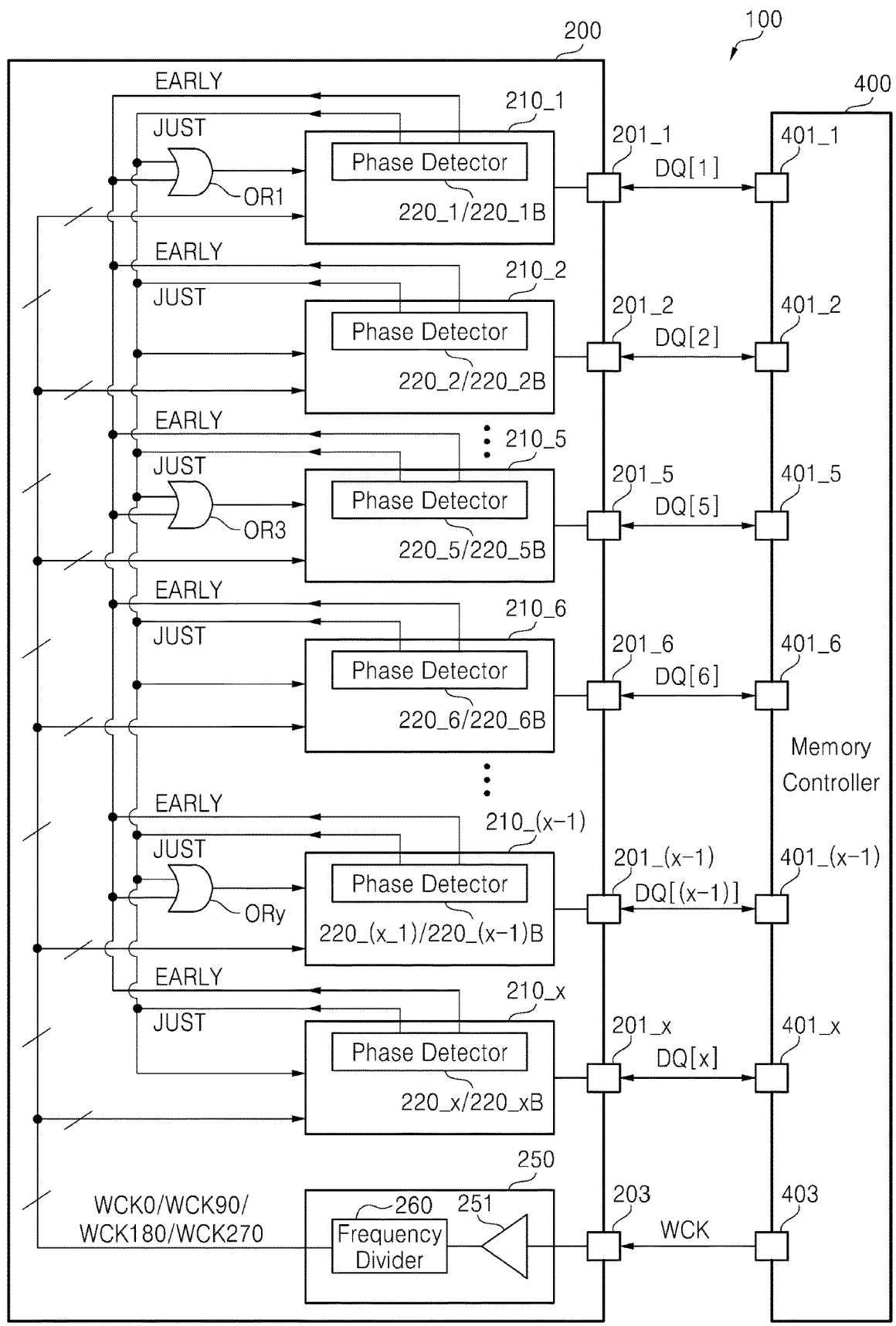
FIG. 2 is a block diagram of a memory system including a detailed circuit of an input/output interface illustrated in FIG. 1.

FIG. 1 is a block diagram of a memory system including a memory device and a memory controller according to an embodiment of the present disclosure, and FIG. 2 is a block diagram of a memory system including a detailed circuit of an input/output interface illustrated in FIG. 1. As shown, the memory system 100 includes a memory device 10 and a memory controller 400 (or a host) in some embodiments. In some embodiments, the memory system 100 may be a mobile device, a personal computer (PC), a computer for server, or a data storage device. The mobile device may be a smartphone, a personal digital assistant (PDA), a laptop computer (e.g., a notebook computer), an internet of things (IoT) device, a wearable device, or a drone. The memory system 100 may be a system on chip (SoC). The memory system 100 may be an in-car entertainment (ICE) system called an in-vehicle infotainment (IVI) system. Also, the memory device 10 may be embodied as a semiconductor die, a die, or an integrated circuit (IC). The memory device 10 may be a dynamic random access memory (DRAM). A semiconductor package or a memory module may include at least one memory device 10.

The memory device 10 according to an embodiment of the present disclosure is configured to perform write training on any one of a plurality of data input/output pins 201_1 to 201_x (x being a natural number greater than or equal to 2) included in an input/output interface 200, and feed result values of the write training back to the memory controller 400 through at least two of the remaining data input/output pins other than the one data input/output pin asynchronously. In this case, write training data for the write training associated with the corresponding data input/output pin may not be written in a memory cell array 20 of the memory device 10. Accordingly, the memory device 10 does not necessarily require the read training operation for the write training data. As described herein, a data input/output pin may refer to a pin (also called a pad) that is used for data input/output in a DDR circuitry.

The memory device 10 includes the memory cell array 20, a control logic circuit 30, and the input/output interface 200 to be described with reference to FIG. 2. The memory cell array 20 may include memory cells (e.g., DRAM cells) arranged in the form of a matrix. The control logic circuit 30 may decode commands and addresses CA received through the input/output interface 200 and write data DQ[x:1] received through the input/output interface 200 from the memory controller 400 in the memory cell array 20 in the write operation, and read data DQ[x:1] from the memory cell array 20 in the read operation and transmit the read data DQ[x:1] to the memory controller 400.

The input/output interface 200 receives and transmits input/output data DQ[x:1] with the memory controller 400 through a bidirectional data bus 104, receives a write clock signal WCK output from the memory controller 400 through a write clock signal bus 103, receives a clock signal CK output from the memory controller 400 through a clock signal bus 102, and receive command and address CA output from the memory controller 400 through a command/address bus 101. In some embodiments, the write clock signal WCK of FIG. 1 may include a complementary write clock signal, and the clock signal CK may include a complementary clock signal.

Figure 4A:
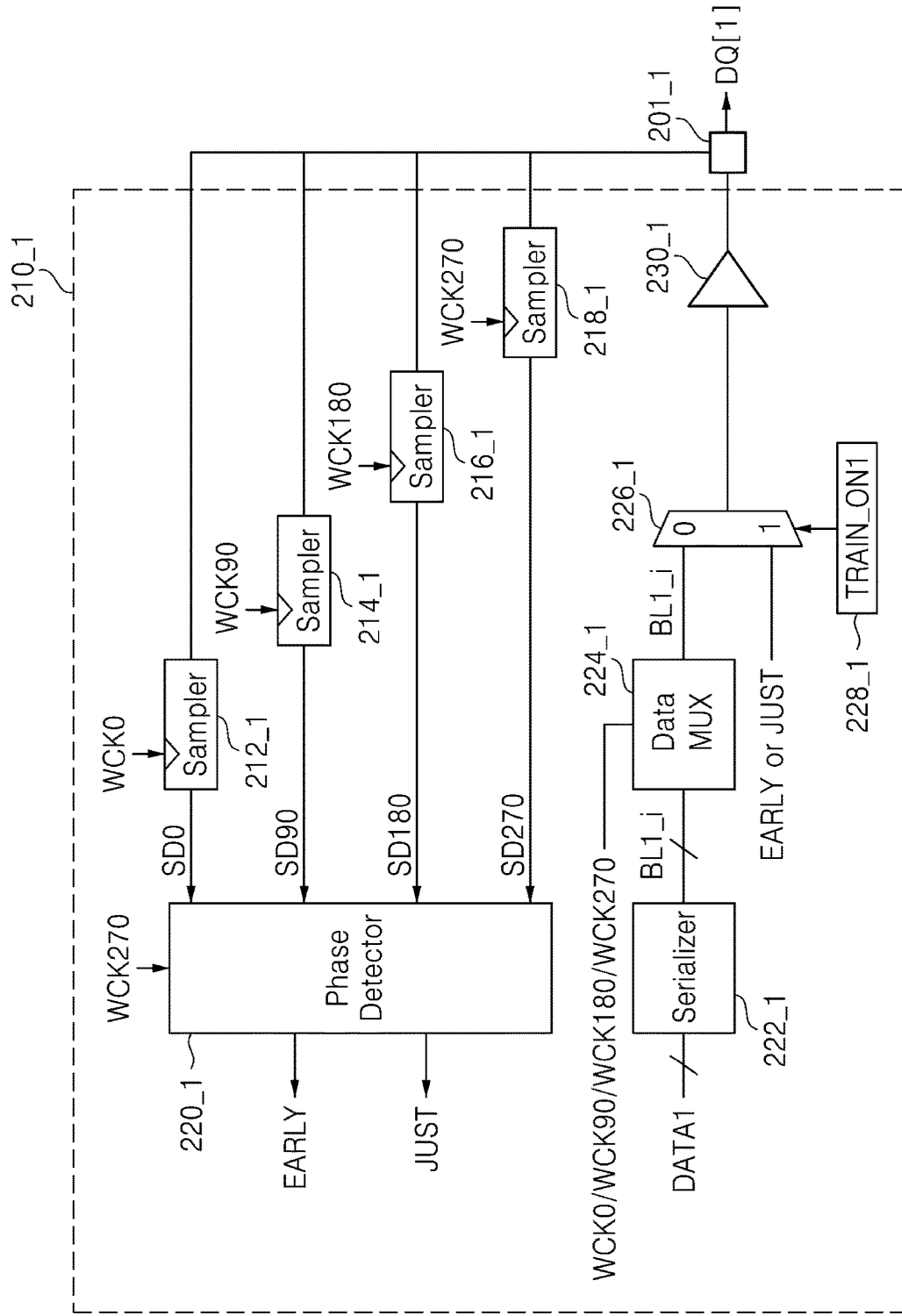
FIG. 4A is a circuit diagram illustrating an embodiment of a first data input/output circuit of FIG. 2 used in write training.
Figure 4B:
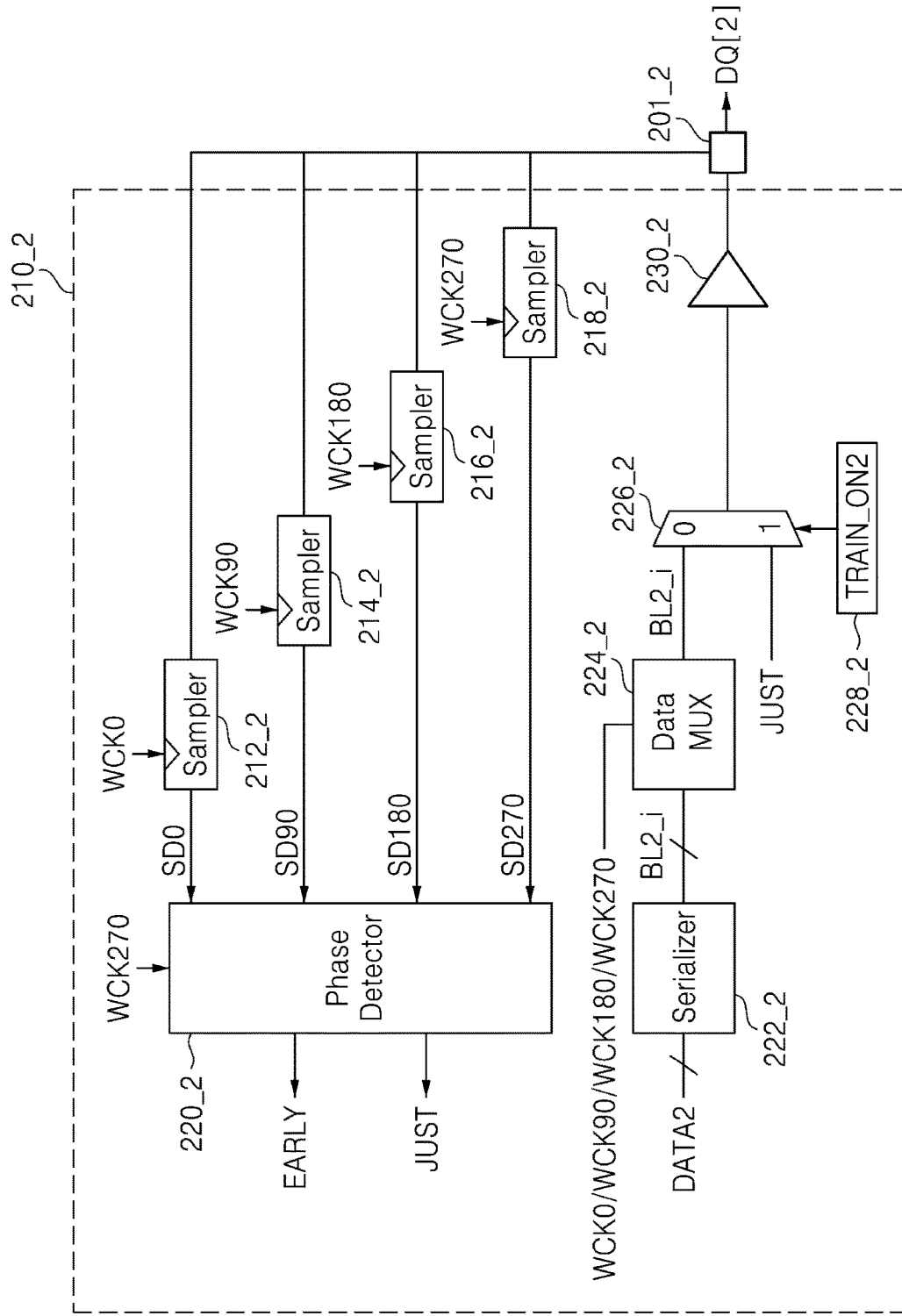
FIG. 4B is a circuit diagram illustrating an embodiment of a second data input/output circuit of FIG. 2 used in write training.
Figure 4C:
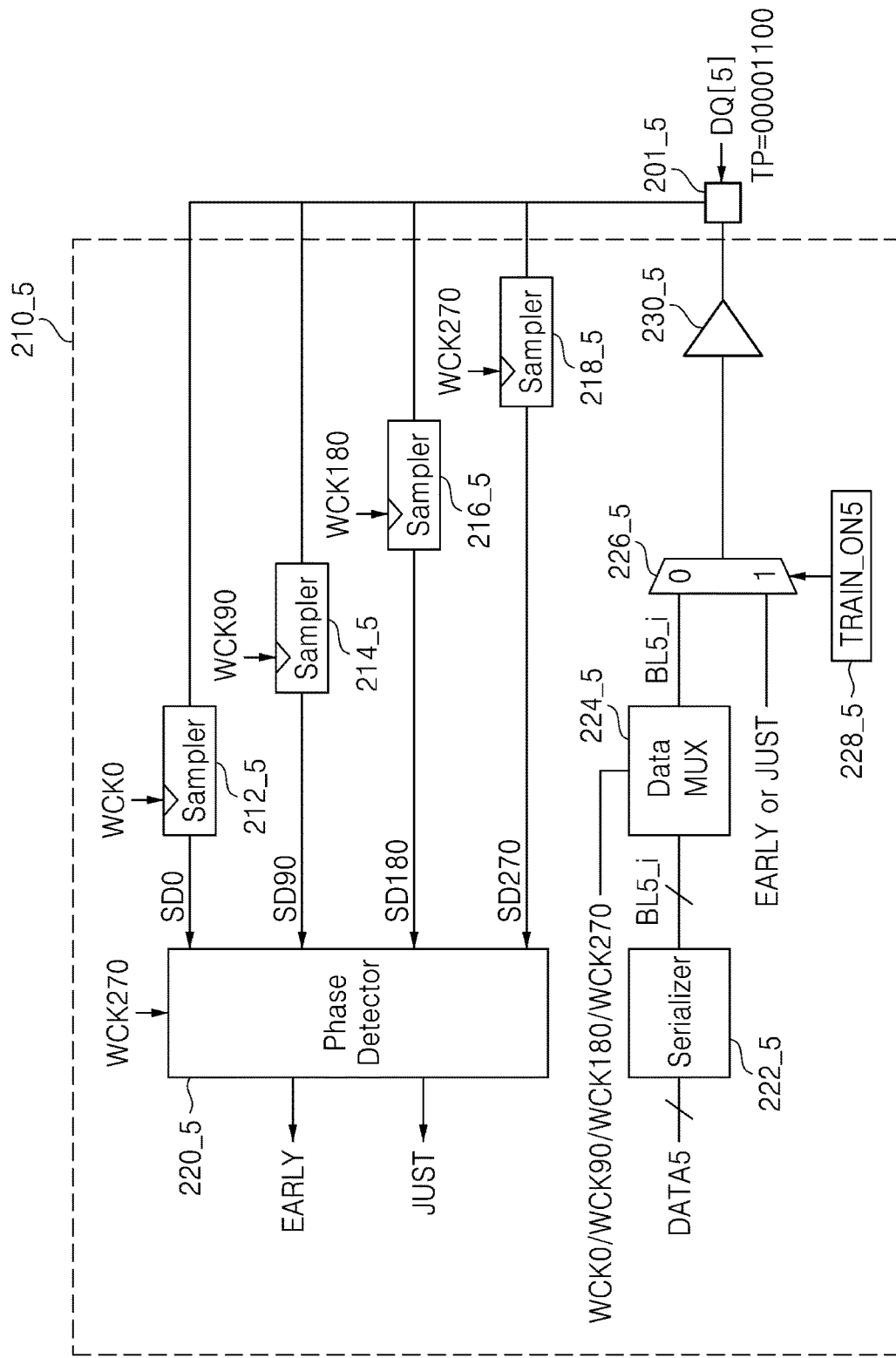
FIG. 4C is a circuit diagram illustrating an embodiment of a third data input/output circuit of FIG. 2 used in write training.
Figure 10A:
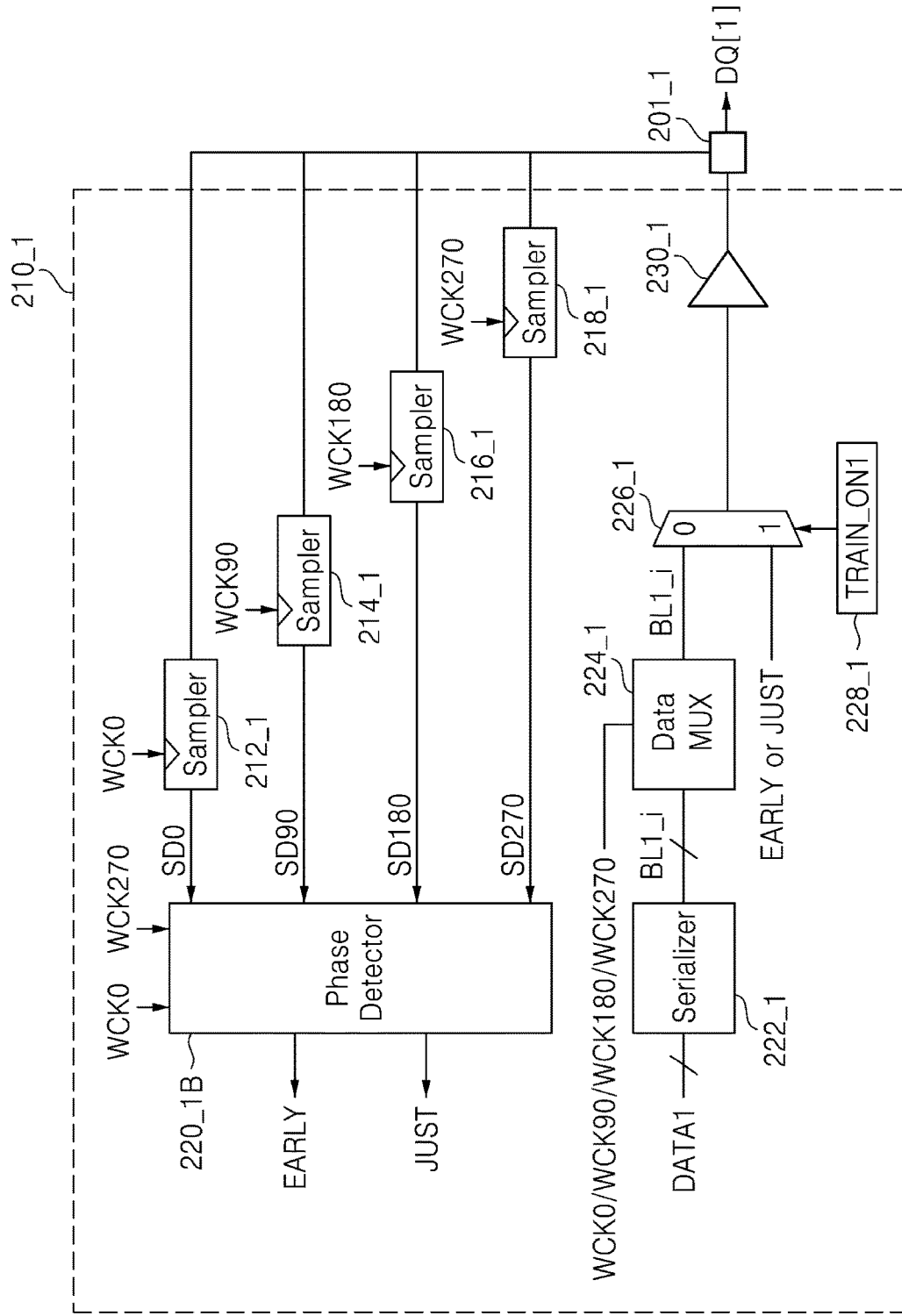
FIG. 10A is a circuit diagram illustrating another embodiment of a first data input/output circuit of FIG. 2 used in write training.
Figure 10B:
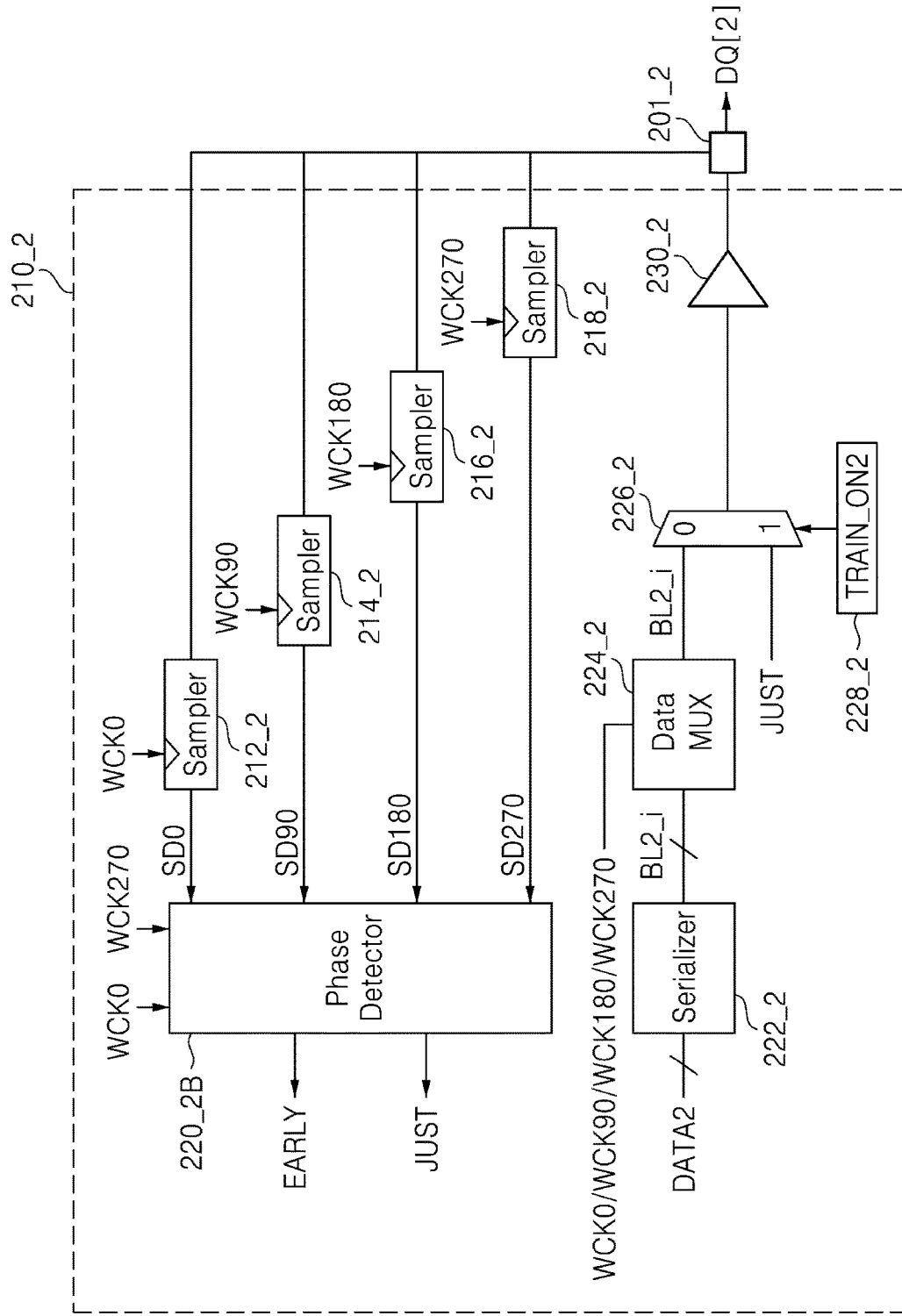
FIG. 10B is a circuit diagram illustrating another embodiment of a second data input/output circuit of FIG. 2 used in write training.
Figure 10C:
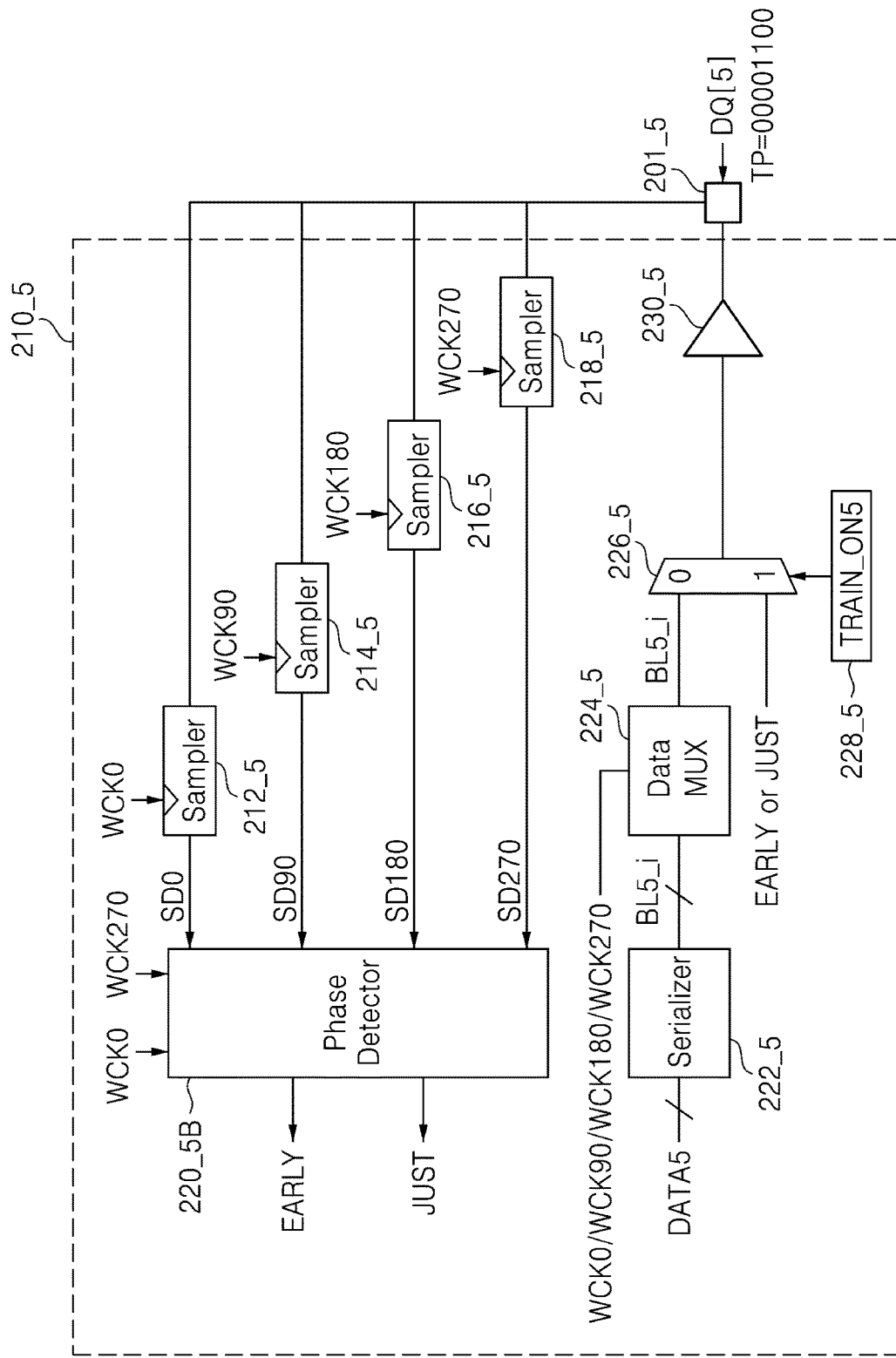
FIG. 10C is a circuit diagram illustrating another embodiment of a third data input/output circuit of FIG. 2 used in write training.

Referring to FIG. 2, the input/output interface 200 includes the plurality of data input/output pins 201_1 to 201_x, a write clock signal pin 203, a plurality of data input/output circuits 210_1 to 210_x, a write clock signal processing circuit 250, and a plurality of OR gates OR1 to ORy (y being a natural number greater than or equal to 2). As illustrated in FIGS. 4A, 4B, and 4C, the data input/output circuits (also called data input/output modules) 210_1 to 210_x may have the same structure. Also, as illustrated in FIGS. 10A, 10B, and 10C, the data input/output circuits 210_1 to 210_x may have the same structure.

The data input/output circuits 210_1 to 210_x illustrated in FIGS. 2, 4A, 4B, and 4C include phase detectors 220_1 to 220_x, respectively. The data input/output circuits 210_1 to 210_x illustrated in FIGS. 2, 10A, 10B, and 10C include phase detectors 220_1B to 220_xB, respectively. When write training data DQ[C] (e.g., DQ[5]=TP) from the memory controller 400 is received, one of the phase detectors 220_1 to 220_x or 220_1B to 220_xB may generate a first detection signal EARLY and/or a second detection signal JUST.

Each of the OR gates OR1 to ORy performs a logic OR operation on the first detection signal EARLY and the second detection signal JUST output from the phase detector receiving the write training data DQ[C] (e.g., DQ[5]) and sends a result of the OR operation to odd-numbered data input/output circuits 210_1, 210_3, 210_5, . . . , 210_(x−1). The second detection signal JUST, which is output from the phase detector receiving the write training data DQ[C] (e.g., DQ[5]=TP) is transferred to even-numbered data input/output circuits 210_2, 210_4, 210_6, . . . , 210_x. For example, when "x" is 12 and "y" is 6, an output signal of the first OR gate OR1 is provided to the first data input/output circuit 210_1; an output signal of the second OR gate OR2 is provided to the third data input/output circuit 210_3; an output signal of the third OR gate OR3 is provided to the fifth data input/output circuit 210_5; and, an output signal of the sixth OR gate OR6 is provided to the eleventh data input/output circuit 210_11.

The write clock signal processing circuit 250 includes a buffer 251 that buffers the write clock signal WCK received through the write clock signal pin 203, and a frequency divider 260 that divides the buffered write clock signal WCK into a plurality of write clock signals.

For example, the frequency divider 260 divides the write clock signal WCK having a first frequency f1 depending on a frequency division ratio, generates sampling write clock signals WCK0, WCK90, WCK180, and WCK270 divided depending on the frequency division ratio so as to have a second frequency f2 and different phases, and outputs the sampling write clock signals WCK0, WCK90, WCK180, and WCK270 to each of the data input/output circuits 210_1 to 210_x.

Phase differences between the sampling write clock signals WCK0 and WCK90, WCK90 and WCK180, WCK180 and WCK270, and WCK270 and WCK0 are 90 degrees; however, phase differences between the sampling write clock signals WCK0 and WCK180 and WCK90 and WCK270 are 180 degrees; and phase differences between the sampling write clock signals WCK0 and WCK270 are 270 degrees. For example, when the first frequency f1 is 4.8 GHz and the frequency division ratio is "2", the second frequency f2 may be 2.4 GHz.

The memory controller 400 includes data input/output pins 401_1 to 401_x (collectively referred to as "401") paired with the data input/output pins 201_1 to 201_x one to one, a write clock signal pin 403 paired with the write clock signal pin 203, a switch circuit 405, a delay controller 410, a write training data generator 420, a write clock signal generator 430, a clock signal generator 440, and a control logic circuit 450.

In response to a switch control signal SCTL output from the control logic circuit 450, the switch circuit 405 connects input terminals of the delay controller 410 and the an output terminal of the write training data generator 420 with data input/output pins associated with the write training from among the data input/output pins 401_1 to 401_x.

For example, in the case of performing the write training by using three data input/output pins 401_1, 401_2, and 401_5, in response to the switch control signal SCTL from the control logic circuit 450, the switch circuit 405 may connect the input terminals of the delay controller 410 with the data input/output pins 401_1 and 401_2 to receive two result values DQ[A] and DQ[B] associated with the write training and may connect the output terminal of the write training data generator 420, which outputs the write training data DQ[C], with the data input/output pin 401_5.

According to another example, in the case of performing the write training by using three data input/output pins 401_1, 401_5, and 401_6, in response to the switch control signal SCTL from the control logic circuit 450, the switch circuit 405 may connect the input terminals of the delay controller 410 with the data input/output pins 401_5 and 401_6 to receive two result values DQ[A] and DQ[B] associated with the write training and may connect the output terminal of the write training data generator 420, which outputs the write training data DQ[C], with the data input/output pin 401_1.

The write training data generator 420 sends the write training data DQ[C] only to a data input/output pin targeted for the write training from among the plurality of data input/output pins 201_1 to 201_x through the switch circuit 405, and the delay controller 410 allows the switch circuit 405 to receive the two result values DQ[A] and DQ[B] associated with the write training only through two data input/output pins among the remaining data input/output pins other than the one data input/output pin.

Figure 3:
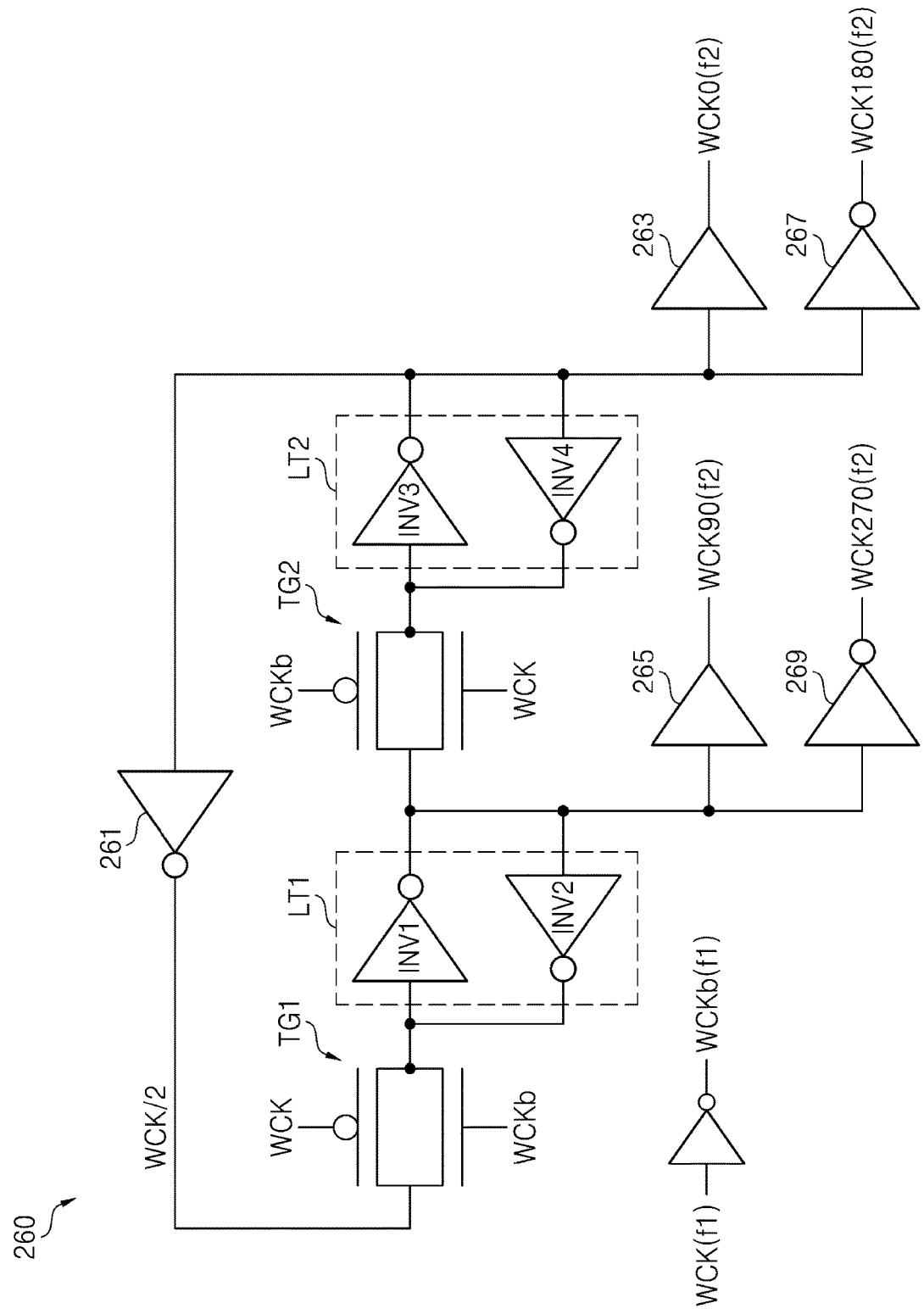
FIG. 3 is a circuit diagram of a frequency divider illustrated in FIG. 2.

FIG. 3 is a circuit diagram of an embodiment of the frequency divider illustrated in FIG. 2. The frequency divider 260 includes a first transmission gate TG1, a first latch LT1, a second transmission gate TG2, a second latch LT2, an inverter 261, a first phase sampling write clock signal generator 263, a second phase sampling write clock signal generator 265, a third phase sampling write clock signal generator 267, and a fourth phase sampling write clock signal generator 269.

The write clock signals WCK and WCKb are complementary signals or differential signals. An inverter inverts the write clock signal WCK(f1) (referred to as "WCK") to generate an inverted write clock signal WCKb(f1) (referred to as "WCKb"). According to an embodiment, the write clock signal WCK is a write clock true signal WCK_t illustrated in FIGS. 6 to 8, and the inverted write clock signal WCKb is a write clock complement signal WCK_c illustrated in FIGS. 6 to 8. When the write clock signal WCK having the first frequency f1 is at the low level, the first transmission gate TG1 transfers an output signal of the inverter 261 to the first latch LT1 depending on the complementary write clock signals WCK and WCKb.

The first latch LT1 includes inverters INV1 and INV2. When the write clock signal WCK having the first frequency f1 is at the high level, the second transmission gate TG2 transfers an output signal of the first latch LT1 to the second latch LT2 depending on the complementary write clock signals WCK and WCKb.

The second latch LT2 includes inverters INV3 and INV4. The inverter 261 inverts an output signal of the second latch LT2 and outputs an inverted signal WCK/2 having the second frequency f2 to the first transmission gate TG1. The frequency divider 260 may generate the sampling write clock signals WCK0, WCK90, WCK180, and WCK270, each of which oscillates.

The first phase sampling write clock signal generator 263 buffers the output signal of the second latch LT2 to output the first phase sampling write clock signal WCK0(f2) having the second frequency f2. The second phase sampling write clock signal generator 265 buffers the output signal of the first latch LT1 to output the second phase sampling write clock signal WCK90(f2) having the second frequency f2.

The third phase sampling write clock signal generator 267 inverts the output signal of the second latch LT2 to output the third phase sampling write clock signal WCK180(f2) having the second frequency f2. The fourth phase sampling write clock signal generator 269 inverts the output signal of the first latch LT1 to output the fourth phase sampling write clock signal WCK270(f2) having the second frequency f2.

Each of the sampling write clock signal generators 267 and 269 may be implemented with an inverter. Below, for convenience of description, the phase sampling write clock signals WCK0(f2), WCK90(f2), WCK180(f2), and WCK270(f2) are simply marked by the phase sampling write clock signals WCK0, WCK90, WCK180, and WCK270.

FIG. 4A is a circuit diagram illustrating an embodiment of a first data input/output circuit of FIG. 2 used in write training, FIG. 4B is a circuit diagram illustrating an embodiment of a second data input/output circuit of FIG. 2 used in write training, and FIG. 4C is a circuit diagram illustrating an embodiment of a fifth data input/output circuit of FIG. 2 used in write training.

The process where the memory device 10 performs write training on the fifth data input/output pin 201_5 and asynchronously feeds back the result values DQ[1] and DQ[2] of the write training to the memory controller 400 through the two data input/output pins 201_1 and 201_2 will be described in detail with reference to FIGS. 1 to 9. Because the data input/output pins 201_1 to 201_$x$ of the memory device 10 are respectively connected with the data input/output pins 401_1 to 401_$x$ of the memory controller 400 through the bidirectional data bus 104, the description will be given as the write training is performed through the respective data input/output pins 201_1 to 201_$x$.

For example, the write training data generator 420 of the memory controller 400 sends the write training data DQ[C] (e.g., DQ[5]=TP="00001100") to the fifth data input/output pin 201_5, and the delay controller 410 receives the result values DQ[1] (e.g., DQ[A]) and DQ[2] (e.g., DQ[B]) of the write training through data input/output pins 201_1 and 201_2, respectively. The fifth data input/output circuit 210_5 connected with the fifth data input/output pin 201_5 receiving the write training data TP performs a function of a sampling circuit.

Referring to FIG. 1, the control logic circuit 450 of the memory controller 400 sends commands (hereinafter referred to as a "write training command") associated with write training to the input/output interface 200 through the command/address bus 101. Herein, it is assumed that the write training command is a command directing to perform write training on the fifth data input/output circuit 210_5 connected with the fifth data input/output pin 201_5 and to feed two result values DQ[1] (e.g., DQ[A]) and DQ[2] (e.g., DQ[B]) associated with the write training back to the memory controller 400 through data input/output pins 201_1 and 201_2 asynchronously.

The control logic circuit 30 writes (or sets) corresponding data in each of memory devices 228_1, 228_2, and 228_5 depending on the write training command from the input/output interface 200. For example, each of the memory devices 228_1, 228_2, and 228_5 may be a register, a special function register (SFR), or a mode register set (MRS), but the present disclosure is not limited thereto.

It is assumed that, when a first selection signal TRAIN_ON1 is set to the high level depending on first data stored in the first memory device 228_1, the memory device is set to a write training mode, and when the first selection signal TRAIN_ON1 is set to the low level depending on first data stored in the first memory device 228_1, the memory device is set to a normal operation mode.

In the write training mode associated with the fifth data input/output pin 201_5, depending on the first selection signal TRAIN_ON1 having the high level, a first select circuit 226_1 of the first data input/output circuit 210_1 outputs an output signal (e.g., EARLY or JUST) of the first OR gate OR1 to the first data input/output pin 201_1 through a first driver 230_1.

It is assumed that a plurality of samplers 212_1, 214_1, 216_1, and 218_1 and the first phase detector 220_1 included in the first data input/output circuit 210_1 are disabled in the write training mode associated with the fifth data input/output pin 201_5. It is assumed that a second selection signal TRAIN_ON2 is set to the high level depending on second data stored in the second memory device 228_2 in the write training mode and the second selection signal TRAIN_ON2 is set to the low level depending on second data stored in the second memory device 228_2 in the normal operation mode.

In the write training mode associated with the fifth data input/output pin 201_5, depending on the second selection signal TRAIN_ON2 having the high level, a second select circuit 226_2 of the second data input/output circuit 210_2 outputs the second detection signal JUST to the second data input/output pin 201_2 through a second driver 230_2. It is assumed that a plurality of samplers 212_2, 214_2, 216_2, and 218_2 and the second phase detector 220_2 included in the second data input/output circuit 210_2 in the write training mode associated with the fifth data input/output pin 201_5.

According to embodiments, it is assumed that a plurality of samplers and a phase detector included in each of the remaining data input/output circuits 220_1 to 220_4 and 210_6 to 210_$x$ of the data input/output circuits 210_1 to 210_$x$ other than the fifth data input/output circuit 210_5 targeted for write training are disabled. It is assumed that an output signal of a fifth select circuit 226_5 is set to a high-impedance state depending on fifth data stored in the fifth memory device 228_5 in the write training mode and a fifth selection signal TRAIN_ON5 is set to the low level depending on fifth data stored in the fifth memory device 228_5 in the normal operation mode.

According to embodiments, it is assumed that the fifth select circuit 226_5 of the fifth data input/output circuit 210_5 is disabled depending on the fifth data stored in the fifth memory device 228_5 in the write training mode associated with the fifth data input/output pin 201_5. It is assumed that a plurality of samplers 212_5, 214_5, 216_5, and 218_5 and the fifth phase detector 220_5 of the fifth data input/output circuit 210_5 are enabled in the write training mode associated with the fifth data input/output pin 201_5. A sampler may be also called a sampling circuit.

The write training data generator, which is also referred to as a test pattern generator 420 of the memory controller 400, generates the write training data DQ[C] (e.g., DQ[5]=TP="00001100") including a write training pattern (e.g., binary number 1100) so as to be transferred to the fifth data input/output pin 201_5 through the switch circuit 405 and the bidirectional data bus 104.

Figure 6:
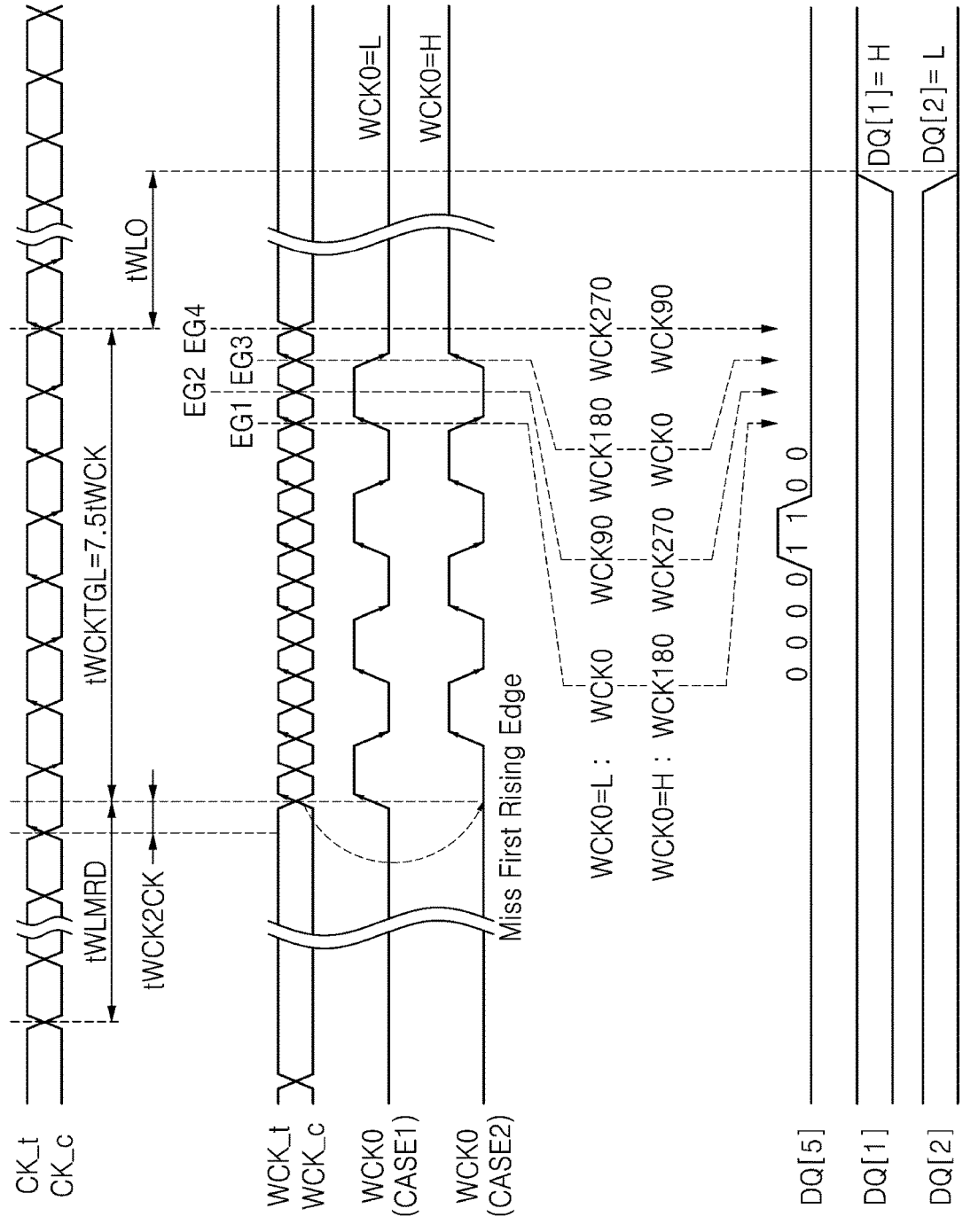
FIG. 6 is a timing diagram for describing a first case of write training performed by using data input/output circuits illustrated in FIG. 4A to 4C or 10A to 10C.
Figure 7:
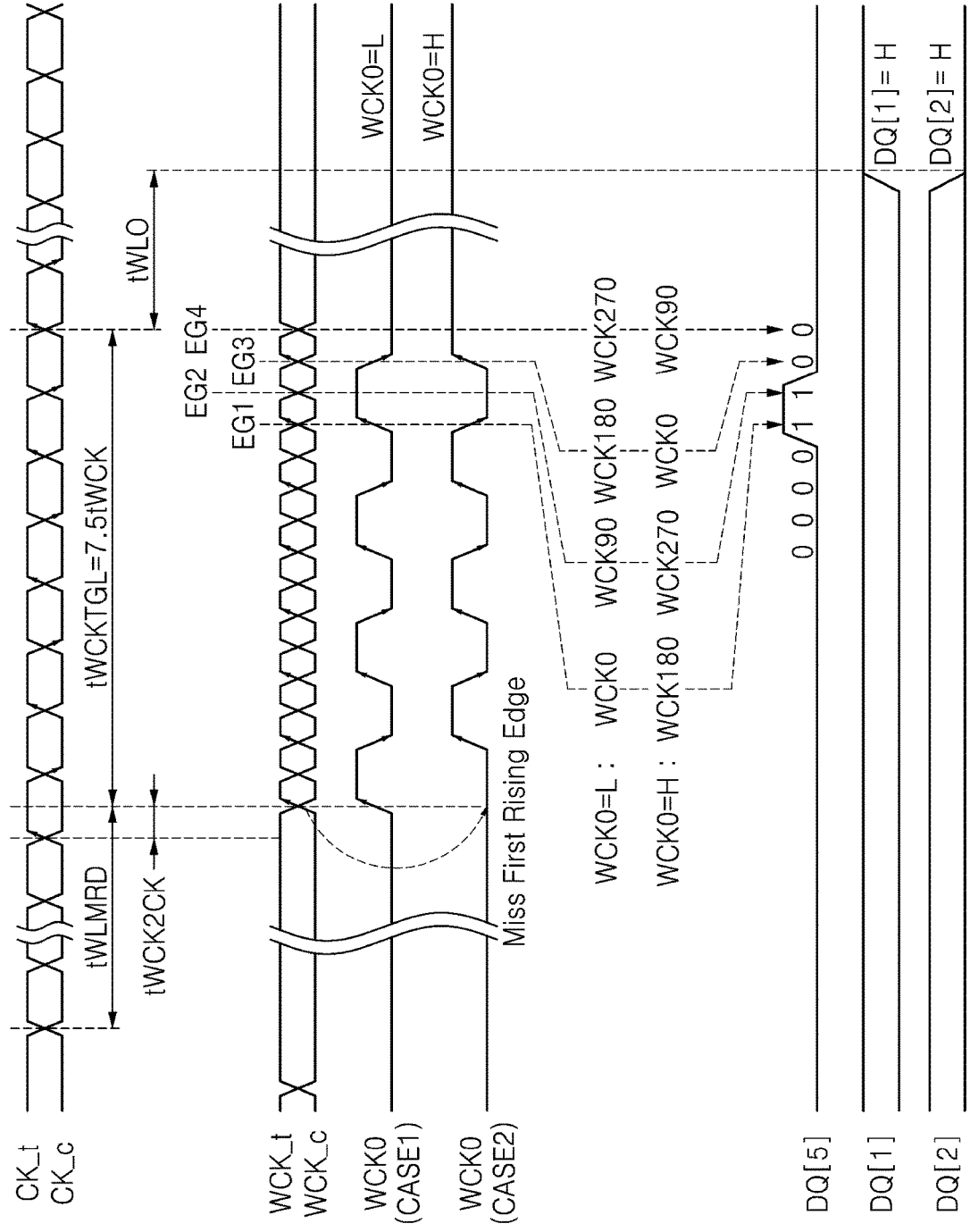
FIG. 7 is a timing diagram for describing a second case of write training performed by using data input/output circuits illustrated in FIG. 4A to 4C or 10A to 10C.
Figure 8:
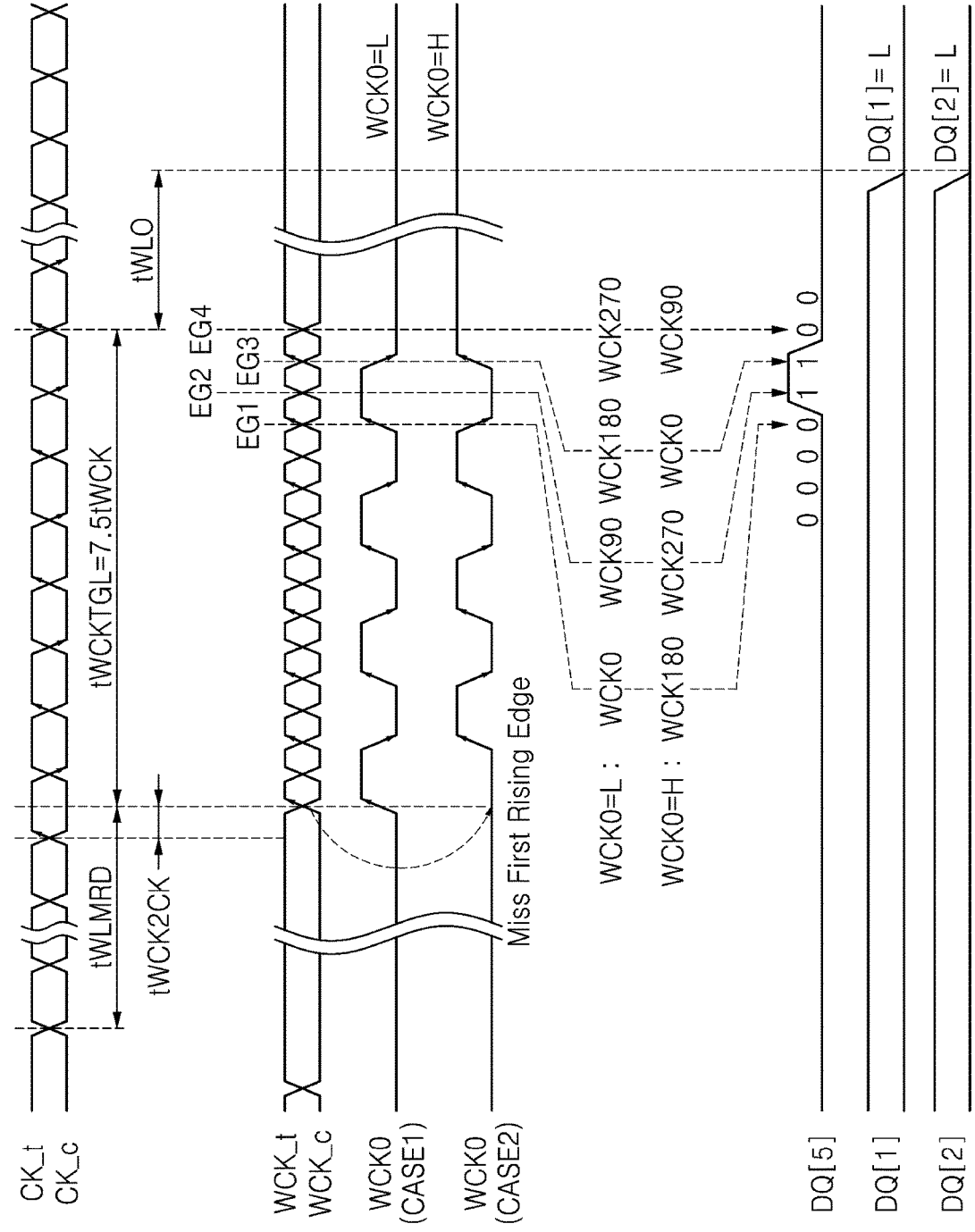
FIG. 8 is a timing diagram for describing a third case of write training performed by using data input/output circuits illustrated in FIG. 4A to 4C or 10A to 10C.

The write clock signal generator 430 of the memory controller 400 generates the write clock signal WCK having the number of times of toggling corresponding to a toggling count control signal CTL output from the control logic circuit 450 so as to be transferred to the write clock signal pin 203 through the write clock signal bus 103. For example, as illustrated in FIGS. 6 to 8, when a size of the write training data TP is 8-bits (e.g., a burst length is 8), the write clock signal generator 430 generates the write clock signal WCK, which toggles for a period of 7.5tWCK, depending on the toggling count control signal CTL. After a toggling period tWCKTGL (e.g., 7.5tWCK) of the write clock signal WCK, the write clock signal WCK may not toggle any longer. In this case, the write clock signal WCK collectively refers to the write clock signals WCK_t and WCK_c.

As illustrated in FIGS. 6 to 8, when the write clock signal WCK does not toggle, the write clock true signal WCK_t maintains the low level, and the write clock complement signal WCK_c maintains the high level. However, according to an embodiment, when the write clock signal WCK does not toggle, the write clock true signal WCK_t may maintain the high level, and the write clock complement signal WCK_c may maintain the low level.

According to another embodiment, when a size of write training data TP is 16-bits (e.g., a burst length is 16), the write clock signal generator 430 generates the write clock signal WCK, which toggles for a period of 15.5tWCK, depending on the toggling count control signal CTL. For example, when a size of the write training data TP (e.g., burst length) is W-bits, the number of times of toggling "N" (e.g., 7.5tWCK or 15.5tWCK) may be a rational number that is smaller than "W" (e.g., 8 or 16) and is greater than (W−1), but the present disclosure is not limited thereto.

The clock signal generator 440 of the memory controller 400 generates the clock signal CK and sends the clock signal CK to the input/output interface 200 through the clock signal bus 102. The clock signal CK includes the clock true signal CK_t and a clock complement signal CK_c, and the clock true and complement signals CK_t and CK_c are complementary clock signals or differential clock signals.

The first sampler 212_5 of the fifth data input/output circuit 210_5 of FIG. 4C samples a corresponding bit value included in the write training data TP (e.g., "00001100") by using an edge (e.g., at least one of a rising edge and a falling edge) of the first phase sampling write clock signal WCK0 and outputs first sampling data SD0. Herein, a bit value may be logic (or data) 0 or logic (or data) 1. The second sampler 214_5 of the fifth data input/output circuit 210_5 samples a corresponding bit value included in the write training data TP ("00001100") by using an edge of the second phase sampling write clock signal WCK90 and outputs second sampling data SD90.

The third sampler 216_5 of the fifth data input/output circuit 210_5 samples a corresponding bit value included in the write training data TP ("00001100") by using an edge of the third phase sampling write clock signal WCK180 and outputs third sampling data SD180. The fourth sampler 218_5 of the fifth data input/output circuit 210_5 samples a corresponding bit value included in the write training data TP ("00001100") by using an edge of the fourth phase sampling write clock signal WCK270 and outputs fourth sampling data SD270. The samplers 212_5, 214_5, 216_5, and 218_5 may be implemented using D-type flip-flops, in some embodiments.

Figure 5:
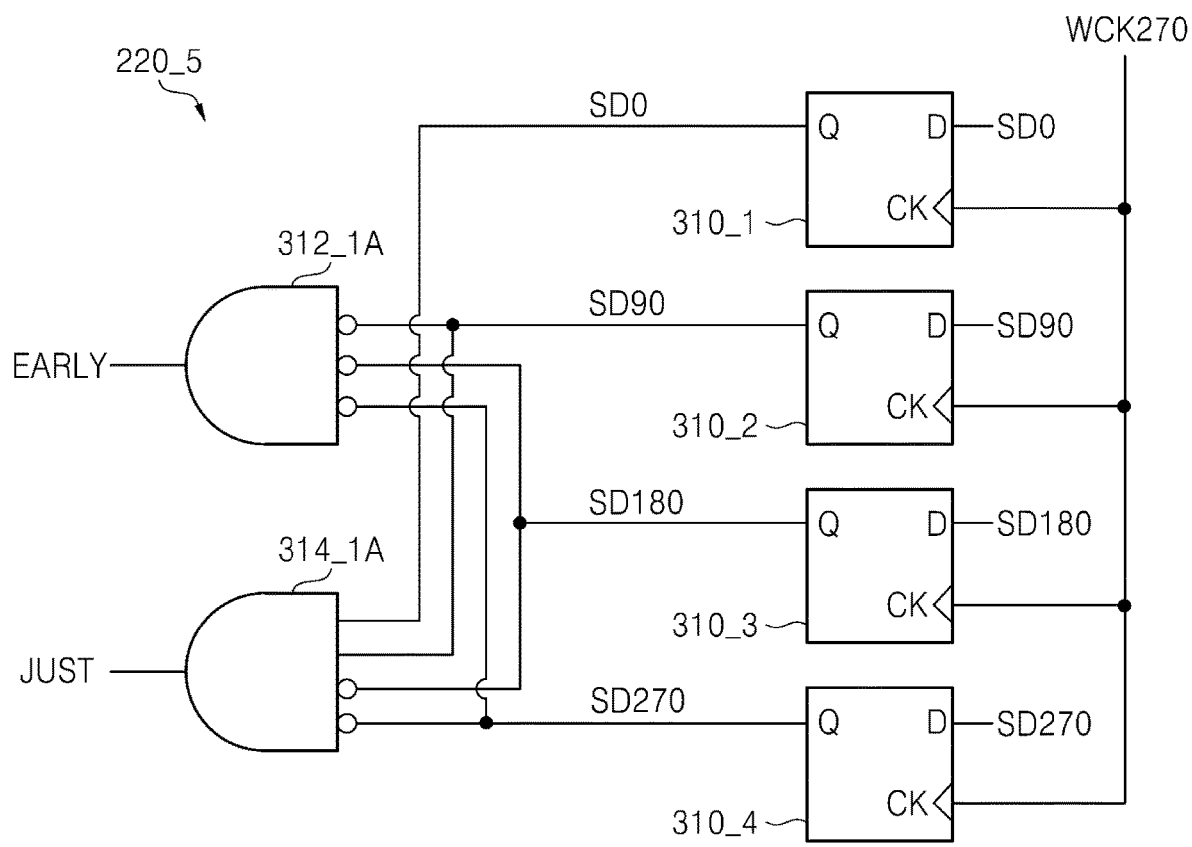
FIG. 5 is a circuit diagram of a fifth phase detector illustrated in FIG. 4C.

FIG. 5 is a circuit diagram of a fifth phase detector illustrated in FIG. 4C, according to an embodiment. Structures and operations of phase detectors respectively included in the data input/output circuits 210_1 to 210_x may be identical to each other. Accordingly, the fifth phase detector 220_5 of the fifth data input/output circuit 210_5 targeted for the write training operation will be described with reference to FIG. 5. The fifth phase detector 220_5 includes a plurality of internal samplers 310_1, 310_2, 310_3, and 310_4, a first detection signal generator 312_1A, and a second detection signal generator 314_1A. Each of the plurality of internal samplers 310_1, 310_2, 310_3, and 310_4 may be implemented with a D-flip-flop.

The internal samplers 310_1, 310_2, 310_3, and 310_4 of the fifth phase detector 220_5 latch the sampling data SD0, SD90, SD180, and SD270, which are respectively input to input terminals "D" thereof, in response to the edge of the fourth phase sampling write clock signal WCK270 and output the latched sampling data SD0, SD90, SD180, and SD270 to output terminals "Q" thereof. As shown, the first detection signal generator 312_1A performs an AND operation on inverted sampling data/SD90, /SD180, and /SD270 to generate the first detection signal EARLY. For example, the first detection signal generator 312_1A detects whether the inverted sampling data /SD90, /SD180, and /SD270 coincide with first reference values (e.g., binary number X000, where "X" denotes a "don't care" value).

In contrast, the second detection signal generator 314_1A performs an AND operation on the first sampling data SD0, the second sampling data SD90, the inverted third sampling data /SD180, and the inverted fourth sampling data SD270 to generate the second detection signal JUST. For example, the second detection signal generator 314_1A detects whether the internal sampling data SD0, SD90, /SD180, and /SD270 input thereto coincide with second reference values (e.g., binary number 1100). As shown, each of the detection signal generators 312_1A and 314_1A may be implemented with an AND gate.

FIG. 6 is a timing diagram for describing a first case of write training performed by using data input/output circuits illustrated in FIG. 4A to 4C or 10A to 10C. After a time tWLMRD illustrated in FIGS. 6 to 8, the memory controller 400 supplies the write clock signal WCK to the memory device 10. In FIGS. 6 to 8, tWCK2CK represents a timing skew (or a phase offset) between the write clock signal WCK and the clock signal CK, and tWLO represents an output delay of result values of write training from a time when toggling of the write clock signal WCK ends. After tWLO, the write training result values DQ[1] and DQ[2] are fed back to the memory controller 400.

The write training may allow the second reference values (e.g., binary number 1100) to be sampled at the last m edges (m being a natural number) (e.g., when m is 4, EG1, EG2, EG3, and EG4) among all the edges of the write clock true signal WCK_t and/or the write clock complement signal WCK_c included within a write clock signal toggling time tWCKTGL. According to embodiments, the second reference values (e.g., binary number 1100) may be changed to other bit values; in this case, the structure of the fifth phase detector 220_5 of FIG. 5 may be also changed. The second reference values (e.g., binary number 1100) may mean a write training pattern.

When the write clock signals WCK_t and WCK_c stop toggling, as in the first case (CASE1), based on the first phase sampling write clock signal WCK0 having the low level L, the first edge EG1 corresponds to the rising edge of the first phase sampling write clock signal WCK0, the second edge EG2 corresponds to the rising edge of the second phase sampling write clock signal WCK90, the third edge EG3 corresponds to the rising edge of the third phase sampling write clock signal WCK180, and the fourth edge EG4 corresponds to the rising edge of the fourth phase sampling write clock signal WCK270.

When the first sampling data SD0 sampled at the first edge EG1 is a logic of 0 (i.e., bit value=0), the second sampling data SD90 sampled at the second edge EG2 is a logic 0, the third sampling data SD180 sampled at the third edge EG3 is a logic 0, and the fourth sampling data SD270 sampled at the fourth edge EG4 is a logic 0, the first detection signal generator 312_1A of FIG. 5 generates the first detection signal EARLY having the high level, and the second detection signal generator 314_1A generates the second detection signal JUST having the low level.

Regardless of the logic of the first sampling data SD0 sampled at the first edge EG1, when the second sampling data SD90 is a logic 0, the third sampling data SD180 is a logic 0, and the fourth sampling data SD270 is a logic 0, the first detection signal generator 312_1A of FIG. 5 generates the first detection signal EARLY having the high level, and the second detection signal generator 314_1A generates the second detection signal JUST having the low level.

The first OR gate OR1 performs the OR operation on the first detection signal EARLY having the high level and the second detection signal JUST having the low level and outputs an OR result having the high level to the first select circuit 226_1. The first select circuit 226_1 outputs the high-level output signal of first OR gate OR1 to the first driver 230_1 based on the first selection signal TRAIN_ON1 having the high level, and the first driver 230_1 drives (or sends) the first data output signal DQ[1] having the high level to the delay controller 410 of the memory controller 400 through the components 201_1, 104, 401_1, and 405. In this case, the first input signal DQ[A] of the delay controller 410 is the first data output signal DQ[1] having the high level.

The second select circuit 226_2 outputs the second detection signal JUST having the low level to the second driver 230_2 depending on the second selection signal TRAIN_ON2 having the high level, and the second driver 230_2 drives the second data output signal DQ[2] having the low level to the delay controller 410 of the memory controller 400 through the components 201_2, 104, 401_2, and 405. In this case, the second input signal DQ[B] of the delay controller 410 is the second data output signal DQ[2] having the low level. The input signals DQ[A] and DQ[B] are the result values DQ[1] and DQ[2] of write training for the fifth data input/output pin 201_5 (i.e., write training performed by using the write clock signal WCK and the write training data TP).

By using (or analyzing or decoding) the first data output signal DQ[1] (e.g., DQ[A]) having the high level and the second data output signal DQ[2] (e.g., DQ[B]) having the low level, the delay controller 410 can determine that the write training data TP (00001100) are transferred to the fifth data input/output pin 201_5 earlier than the desired timing (or a scheduled time), generates a delay control signal DCTL based on a result of the determination, and sends a delay control signal DCTL indicating that the write training data TP is received earlier than the desired timing, to the write training data generator 420.

In response to receiving the delay control signal DCTL, the write training data generator 420 of the memory controller 400 adjusts (e.g., delays) the timing to send the write training data TP (00001100), and sends the write training data TP (00001100) to the fifth data input/output pin 201_5 through the components 405, 401_5, and 104 at the adjusted timing. For example, referring to FIGS. 1 and 6, when the memory device 10 outputs, to the memory controller 400, the delay control signal DCTL including the first data output signal DQ[A] having a high level ("1") and the second data output signal DQ[B] having a low level ("0") in response to receiving the write training data TP, the memory controller 400 may determine that the write training data TP was transmitted early to the memory device 10, and resend the write training data TP at a later timing based on the delay control signal DCTL.

FIG. 7 is a timing diagram for describing a second case of write training performed by using data input/output circuits illustrated in FIGS. 4A to 4C or 10A to 10C. Referring to FIGS. 1 to 5 and 7, based on the first phase sampling write clock signal WCK0 having the low level when the toggling of the write clock signals WCK_t and WCK_c stops, when the first sampling data SD0 sampled at the first edge EG1 is a logic 1, the second sampling data SD90 sampled at the second edge EG2 is a logic 1, the third sampling data SD180 sampled at the third edge EG3 is a logic 0, and the fourth sampling data SD270 sampled at the fourth edge EG4 is a logic 0, the first detection signal generator 312_1A of FIG. 5 generates the first detection signal EARLY having the low level, and the second detection signal generator 314_1A generates the second detection signal JUST having the high level.

The first OR gate OR1 performs an OR operation on the first detection signal EARLY having the low level and the second detection signal JUST having the high level and outputs an OR result having the high level to the first select circuit 226_1. The first select circuit 226_1 outputs the high-level output signal of the first OR gate OR1 to the first driver 230_1 depending on the first selection signal TRAIN_ON1 having the high level, and the first driver 230_1 drives the first data output signal DQ[1] having the high level to the delay controller 410 of the memory controller 400 through the components 201_1, 104, 401_1, and 405.

The second select circuit 226_2 outputs the second detection signal JUST having the high level to the second driver 230_2 depending on the second selection signal TRAIN_ON2 having the high level, and the second driver 230_2 drives the second data output signal DQ[2] having the high level to the delay controller 410 of the memory controller 400 through the components 201_2, 104, 401_2, and 405.

By using the first data output signal DQ[1] (e.g., DQ[A]) having the high level and the second data output signal DQ[2] (e.g., DQ[B]) having the high level, and the delay controller 410 determines that the write training data TP (00001100) is accurately transferred to the fifth data input/output pin 201_5 and may terminate the write training. However, the one or more embodiments are not limited thereto, and the memory controller 400 may continue to perform write training until it receives a predetermined number of JUST signal (e.g., DQ[A] having a high level ("1") and DQ[B] having a high level ("1").

FIG. 8 is a timing diagram for describing a third case of write training performed by using data input/output circuits illustrated in FIGS. 4A to 4C or 10A to 10C. Referring to FIGS. 1 to 5 and 8, based on the first phase sampling write clock signal WCK0 having the low level when the toggling of the write clock signals WCK_t and WCK_c stops, when the first sampling data SD0 sampled at the first edge EG1 is a logic 0, the second sampling data SD90 sampled at the second edge EG2 is a logic 1, the third sampling data SD180 sampled at the third edge EG3 is a logic 1, and the fourth sampling data SD270 sampled at the fourth edge EG4 is a logic 0, the first detection signal generator 312_1A of FIG. 5 generates the first detection signal EARLY having the low level, and the second detection signal generator 314_1A generates the second detection signal JUST having the low level.

The first OR gate OR1 performs an OR operation on the first detection signal EARLY having the low level and the second detection signal JUST having the low level and outputs an OR result having the low level to the first select circuit 226_1. The first select circuit 226_1 outputs the low-level output signal of the first OR gate OR1 to the first driver 230_1 depending on the first selection signal TRAIN_ON1 having the high level, and the first driver 230_1 drives the first data output signal DQ[1] having the high level to the delay controller 410 of the memory controller 400 through the components 201_1, 104, 401_1, and 405.

The second select circuit 226_2 outputs the second detection signal JUST having the low level to the second driver 230_2 depending on the second selection signal TRAIN_ON2 having the high level, and the second driver 230_2 drives the second data output signal DQ[2] having the low level to the delay controller 410 of the memory controller 400 through the components 201_2, 104, 401_2, and 405.

By using the first data output signal DQ[1] (e.g., DQ[A]) having the low level and the second data output signal DQ[2] (e.g., DQ[B]) having the low level, the delay controller 410 determines that the write training data TP (00001100) are transferred to the fifth data input/output pin 201_5 later than the desired timing (or a scheduled time), generates the delay control signal DCTL depending on a result of the determination, and sends the delay control signal DCTL to the write training data generator 420. In response, the write training data generator 420 adjusts the timing to send the write training data TP (00001100) depending on the delay control signal DCTL and again sends the write training data TP (00001100) to the fifth data input/output pin 201_5 through the components 405, 401_5, and 104. For example, referring to FIGS. 1 and 8, when the memory device 10 outputs, to the memory controller 400, the delay control signal DCTL including the first data output signal DQ[A] having a low level ("0") and the second data output signal DQ[B] having a low level ("0") in response to receiving a first write training data TP, the memory controller 400 may determine that the write training data TP was transmitted late to the memory device 10, and resend the write training data TP at an earlier timing based on the delay control signal DCTL. As described with reference to FIGS. 6 to 8, until both the first data output signal DQ[1] (DQ[a]) and the second data output signal DQ[2] (DQ[b]) are set to the high level, the memory controller 400 adjusts the timing to send the write training data TP (00001100) to be provided to the fifth data input/output pin 201_5 targeted for write training.

Figure 9:
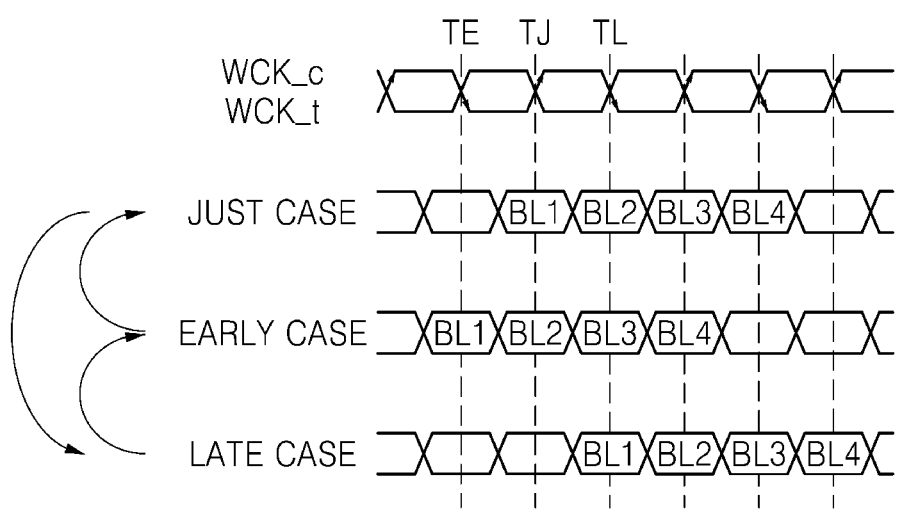
FIG. 9 is a timing diagram of data according to write training performed by using data input/output circuits illustrated in FIG. 4A to 4C or 10A to 10C.

FIG. 9 is a timing diagram of data according to write training performed by using data input/output circuits illustrated in FIGS. 4A to 4C or 10A to 10C. In FIG. 9, it is assumed that a second time TJ is an accurate timing (or a scheduled time), a first time TE is a time earlier than the second time TJ, and a third time TL is a time later than the second time TJ. At the second time TJ, the center of each of data BL1 to BL4 is aligned with the edges of the write clock signals WCK_t and WCK_c.

When a second case JUST CASE of FIG. 9 corresponds to the second case JUST CASE of FIG. 7, the second case JUST CASE of FIG. 9 is an embodiment of 4-bit data BL1, BL2, BL3, and BL4 output from the fifth data input/output circuit 210_5 in the normal read operation. Herein, BL1 represents a set of BL1_1, BL2_1, and BL5_1; BL2 represents a set of BL1_2, BL2_2, and BL5_2; BL3 represents a set of BL1_3, BL2_3, and BL5_3; BL4 represents a set of BL1_4, BL2_4, and BL5_4.

When a first case EARLY CASE of FIG. 9 corresponds to the first case EARLY CASE of FIG. 6, the first case EARLY CASE of FIG. 9 is an embodiment of the 4-bit data BL1, BL2, BL3, and BL4 output from the fifth data input/output circuit 210_5 in the normal read operation. However, when a third case LATE CASE of FIG. 9 corresponds to the third case LATE CASE of FIG. 8, the third case LATE CASE of FIG. 9 is an embodiment of 4-bit data BL1, BL2, BL3, and BL4 output from the fifth data input/output circuit 210_5 in the normal read operation.

FIG. 10A is a circuit diagram illustrating another embodiment of a first data input/output circuit of FIG. 2 used in write training, FIG. 10B is a circuit diagram illustrating another embodiment of a second data input/output circuit of FIG. 2 used in write training, and FIG. 10C is a circuit diagram illustrating another embodiment of a fifth data input/output circuit of FIG. 2 used in write training. Referring to FIGS. 2, 10A, 10B, and 10C, the data input/output circuits 210_1 to 210_x include the phase detectors 220_1B to 220_xB, respectively. Only a phase detector, which receives the write training data TP from the memory controller 400, from among the phase detectors 220_1B to 220_xB, generates the first detection signal EARLY and the second detection signal JUST.

How to perform write training on the fifth data input/output pin 201_5 and to asynchronously feed the result values DQ[1] and DQ[2] of the write training back to the memory controller 400 through the two data input/output pins 201_1 and 201_2 will be described in detail with reference to FIGS. 1, 2, 3, and 6 to 11.

Only the fourth phase sampling write clock signal WCK270 is supplied to the phase detectors 220_1, 220_2, and 220_5 illustrated in FIGS. 4A, 4B, and 4C; however, the first phase sampling write clock signal WCK0 and the fourth phase sampling write clock signal WCK270 are together supplied to the phase detectors 220_1B, 220_2B, and 220_5B illustrated in FIGS. 10A, 10B, and 10C.

Figure 11:
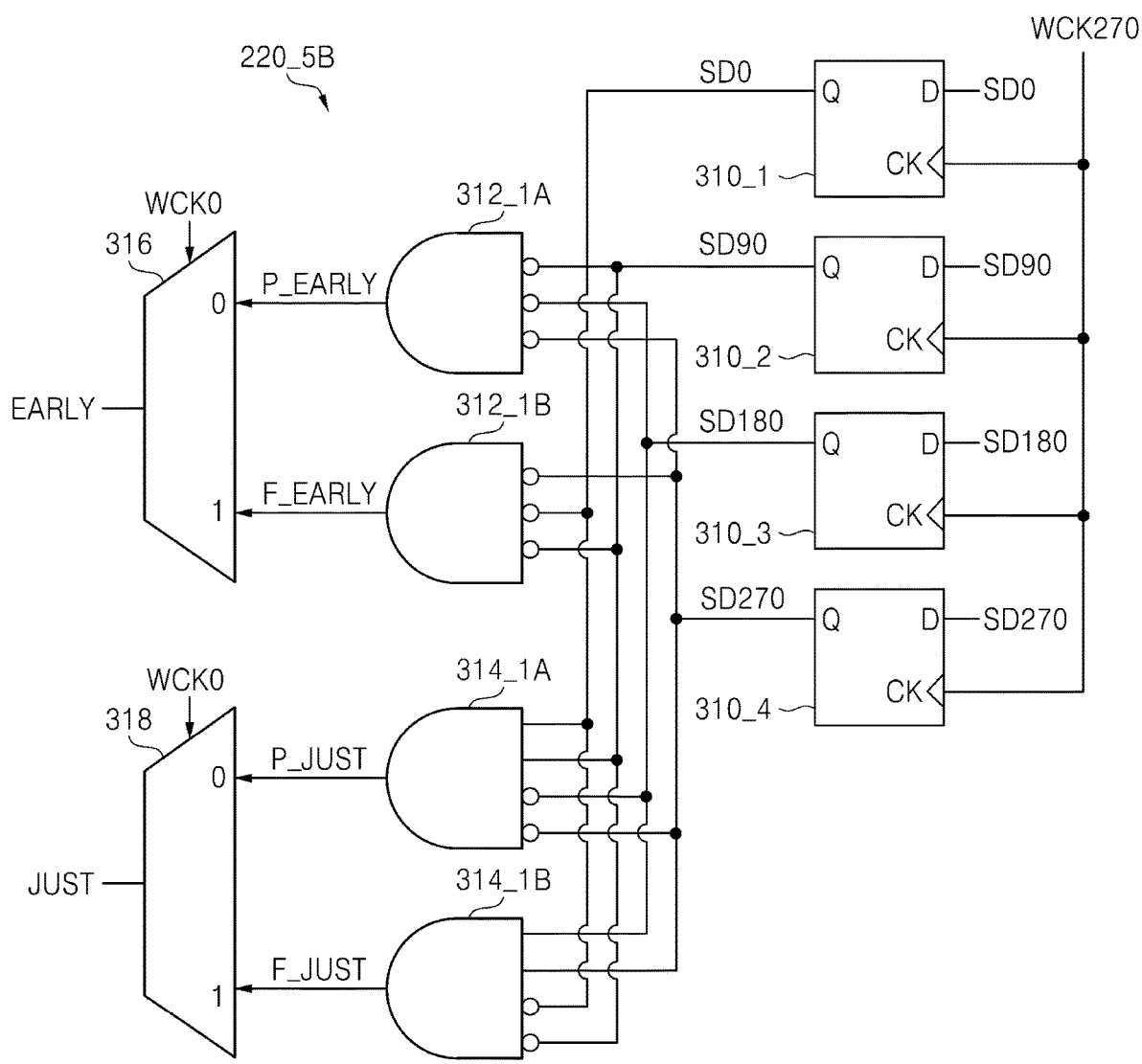
FIG. 11 is a circuit diagram of a fifth phase detector illustrated in FIG. 10C.

FIG. 11 is a circuit diagram of a fifth phase detector illustrated in FIG. 10C. As illustrated in FIGS. 6 to 8, the frequency divider 260 of FIG. 3 may fail to operate due to the inter-symbol interference (ISI) at a time when the write clock signals WCK_t and WCK_c start to toggle; in this case, the frequency divider 260 may miss one edge of the write clock true signal WCK_t.

In the case where the frequency divider 260 of FIG. 3 does not miss one edge (e.g., a first rising edge) of the write clock true signal WCK_t, like the first case CASE1 of FIGS. 6 to 8, it is assumed that the first phase sampling write clock signal WCK0 is at the low level when the toggling of the write clock signals WCK_t and WCK_c stops. However, in the case where the frequency divider 260 of FIG. 3 misses one edge (e.g., a first rising edge) of the write clock true signal WCK_t, like the second case CASE2 of FIGS. 6 to 8, it is assumed that the first phase sampling write clock signal WCK0 is at the high level when the toggling of the write clock signals WCK_t and WCK_c stops.

For example, when the toggling of the write clock signals WCK_t and WCK_c stops, the memory device 10, for example, the control logic circuit 30 may determine whether the frequency divider 260 misses one edge (e.g., a first rising edge) of the write clock true signal WCK_t, depending on the level of the first phase sampling write clock signal WCK0.

When the toggling of the write clock signals WCK_t and WCK_c stops, like the first case CASE1 of FIGS. 6 to 8 where the first phase sampling write clock signal WCK0 is at the low level (WCK0=L), it is assumed that the sampling order of the samplers 212_5, 214_5, 216_5, and 218_5 of FIG. 10C is as follows: WCK0→WCK90→WCK180→WCK270. However, when the toggling of the write clock signals WCK_t and WCK_c stops, like the second case CASE2 of FIGS. 6 to 8 where the first phase sampling write clock signal WCK0 is at the high level (WCK0=H), it is assumed that the sampling order of the samplers 212_5, 214_5, 216_5, and 218_5 of FIG. 10C is WCK180→WCK270→WCK0→WCK90.

Referring to FIGS. 2 and 11, structures and operations of the phase detectors 220_1B to 220_xB included in the data input/output circuits 210_1 to 210_x are identical. Accordingly, the fifth phase detector 220_56 of the fifth data input/output circuit 210_5 targeted for the write training operation will be described with reference to FIG. 11.

The fifth phase detector 220_56 of FIG. 11 includes a plurality of internal samplers 310_1, 310_2, 310_3, and 310_4, a first detection signal generator 312_1A, a second detection signal generator 314_1A, a third detection signal generator 312_1B, a fourth detection signal generator 314_1B, a first select circuit 316, and a second select circuit 318. Each of the select circuits 316 and 318 may be implemented with a multiplexer.

Each of the plurality of internal samplers 310_1, 310_2, 310_3, and 310_4 may be implemented with a D-flip-flop. The internal samplers 310_1, 310_2, 310_3, and 310_4 of the fifth phase detector 220_56 latch the sampling data SD0, SD90, SD180, and SD270, which are respectively input to input terminals "D" thereof, in response to the edge of the fourth phase sampling write clock signal WCK270 and output the latched sampling data SD0, SD90, SD180, and SD270 to output terminals "Q" thereof.

Each of the detection signal generators 312_1A, 312_1B, 314_1A and 314_1B may be implemented with an AND gate. The first detection signal generator 312_1A performs a logical AND operation on the inverted sampling data /SD90, /SD180, and /SD270 to generate a first logical product signal P_EARLY. The second detection signal generator 314_1A performs an AND operation on the first sampling data SD0, the second sampling data SD90, the inverted third sampling data/SD180, and the inverted fourth sampling data SD270 to generate a second logical product signal P_JUST. The third detection signal generator 312_1B performs an AND operation on the inverted sampling data/SD0, /SD90, and/SD270 to generate a third logical product signal F_EARLY. The fourth detection signal generator 314_1B performs an AND operation on the inverted first sampling data/SD0, the inverted second sampling data/SD90, the third sampling data SD180, and the fourth sampling data SD270 to generate a fourth logical product signal F_JUST.

The first select circuit 316 may output the first logical product signal P_EARLY or the third logical product signal F_EARLY as the first detection signal EARLY depending on the level of the first phase sampling write clock signal WCK0. For example, when the first phase sampling write clock signal WCK0 is at the low level, the first select circuit 316 may output the first logical product signal P_EARLY as the first detection signal EARLY; however, when the first phase sampling write clock signal WCK0 is at the high level, the first select circuit 316 may output the third logical product signal F_EARLY as the first detection signal EARLY.

The second select circuit 318 may output the second logical product signal P_JUST or the fourth logical product signal F_JUST as the second detection signal JUST depending on the level of the first phase sampling write clock signal WCK0. For example, when the first phase sampling write clock signal WCK0 is at the low level, the second select circuit 318 may output the second logical product signal P_JUST as the second detection signal JUST; but, when the first phase sampling write clock signal WCK0 is at the high level, the second select circuit 318 may output the fourth logical product signal F_JUST as the second detection signal JUST.

Returning to FIGS. 6 to 8, it is assumed that, based on the first phase sampling write clock signal WCK0 having the high level when the toggling of the write clock signals WCK_t and WCK_c stop, the first edge EG1 corresponds to the rising edge of the third phase sampling write clock signal WCK180, the second edge EG2 corresponds to the rising edge of the fourth phase sampling write clock signal WCK270, the third edge EG3 corresponds to the rising edge of the first phase sampling write clock signal WCK0, and the fourth edge EG4 corresponds to the rising edge of the second phase sampling write clock signal WCK90.

Referring to FIG. 6, when the third sampling data SD180 sampled at the first edge EG1 is a logic 0, the fourth sampling data SD270 sampled at the second edge EG2 is a logic 0, the first sampling data SD0 sampled at the third edge EG3 is a logic 0, and the second sampling data SD90 sampled at the fourth edge EG4 is a logic 0, the first detection signal generator 312_1A of FIG. 11 generates the first logical product signal P_EARLY having the high level, the third detection signal generator 312_1B generates the third logical product signal F_EARLY having the high level, the second detection signal generator 314_1A generates the second logical product signal P_JUST having the low level, and the fourth detection signal generator 314_1B generates the fourth logical product signal F_JUST having the low level.

Depending on the first phase sampling write clock signal WCK0 (=H) having the high level, the first select circuit 316 outputs the third logical product signal F_EARLY having the high level as the first detection signal EARLY. Also, depending on the first phase sampling write clock signal WCK0 (=H) having the high level, the second select circuit 318 outputs the fourth logical product signal F_JUST having the low level as the second detection signal JUST.

The first OR gate OR1 of FIG. 2 performs an OR operation on the first detection signal EARLY having the high level and the second detection signal JUST having the low level and outputs an OR result having the high level to the first select circuit 226_1. The first select circuit 226_1 of FIG. 10A outputs the high-level output signal of the first OR gate OR1 to the first driver 230_1 depending on the first selection signal TRAIN_ON1 having the high level, and the first driver 230_1 drives the first data output signal DQ[1] having the high level to the delay controller 410 of the memory controller 400 through the components 201_1, 104, 401_1, and 405. In this case, the first input signal DQ[A] of the delay controller 410 is the first data output signal DQ[1] having the high level.

The second select circuit 226_2 of FIG. 10B outputs the second detection signal JUST having the low level to the second driver 230_2 depending on the second selection signal TRAIN_ON2 having the high level. And, the second driver 230_2 drives the second data output signal DQ[2] having the low level to the delay controller 410 of the memory controller 400 through the components 201_2, 104, 401_2, and 405. In this case, the second input signal DQ[B] of the delay controller 410 is the second data output signal DQ[2] having the low level.

By using (or analyzing or decoding) the first data output signal DQ[1] (=DQ[A]) having the high level and the second data output signal DQ[2] (=DQ[B]) having the low level, the delay controller 410 of FIG. 1 determines that the write training data TP (=00001100) are transferred to the fifth data input/output pin 201_5 before the desired timing (or a scheduled time), generates the delay control signal DCTL depending on a result of the determination, and sends the delay control signal DCTL to the write training data generator 420.

The write training data generator 420 adjusts (e.g., delays) the timing to send the write training data TP (=00001100) depending on the delay control signal DCTL and again sends the write training data TP (=00001100) to the fifth data input/output pin 201_5 through the components 405, 401_5, and 104 at the timing illustrated in FIG. 7 as an example.

Referring to FIGS. 2, 7, 10A, 10B, 10C, and 11, based on the first phase sampling write clock signal WCK0 (=H) having the high level when the toggling of the write clock signals WCK_t and WCK_c stops, when the third sampling data SD180 sampled at the first edge EG1 is a logic 1, the fourth sampling data SD270 sampled at the second edge EG2 is a logic 1, the first sampling data SD0 sampled at the third edge EG3 is a logic 0, and the second sampling data SD90 sampled at the fourth edge EG4 is a logic 0, the first detection signal generator 312_1A of FIG. 11 generates the first logical product signal P_EARLY having the low level, the third detection signal generator 312_1B generates the third logical product signal F_EARLY having the low level, the second detection signal generator 314_1A generates the second logical product signal P_JUST having the low level, and the fourth detection signal generator 314_1B generates the fourth logical product signal F_JUST having the high level.

Depending on the first phase sampling write clock signal WCK0 (=H) having the high level, the first select circuit 316 outputs the third logical product signal _EARLY having the low level as the first detection signal EARLY. Also, depending on the first phase sampling write clock signal WCK0 (=H) having the high level, the second select circuit 318 outputs the fourth logical product signal F_JUST having the high level as the second detection signal JUST.

The first OR gate OR1 of FIG. 2 performs a logical OR operation on the first detection signal EARLY having the low level and the second detection signal JUST having the high level and outputs an OR result having the high level to the first select circuit 226_1.

The first select circuit 226_1 of FIG. 10A outputs the high-level output signal of the first OR gate OR1 to the first driver 230_1 depending on the first selection signal TRAIN_ON1 having the high level, and the first driver 230_1 drives the first data output signal DQ[1] having the high level to the delay controller 410 of the memory controller 400 through the components 201_1, 104, 401_1, and 405.

The second select circuit 226_2 of FIG. 10B outputs the second detection signal JUST having the high level to the second driver 230_2 depending on the second selection signal TRAIN_ON2 having the high level, and the second driver 230_2 drives the second data output signal DQ[2] having the high level to the delay controller 410 of the memory controller 400 through the components 201_2, 104, 401_2, and 405.

Depending on the first data output signal DQ[1] (=DQ[A]) having the high level and the second data output signal DQ[2] (=DQ[B]) having the high level, the delay controller 410 of FIG. 1 determines that the write training data TP (=00001100) are accurately transferred to the fifth data input/output pin 201_5 and may terminate the write training depending on a result of the determination.

Referring to FIGS. 2, 8, 10A, 10B, 10C, and 11, based on the first phase sampling write clock signal WCK0 (=H) having the high level when the toggling of the write clock signals WCK_t and WCK_c stops, when the third sampling data SD180 sampled at the first edge EG1 is a logic 0, the fourth sampling data SD27 sampled at the second edge EG2 is a logic 1, the first sampling data SD0 sampled at the third edge EG3 is a logic 1, and the second sampling data SD90 sampled at the fourth edge EG4 is a logic 0, the first detection signal generator 312_1A of FIG. 11 generates the first logical product signal P_EARLY having the low level, the third detection signal generator 312_1B generates the third logical product signal F_EARLY having the low level, the second detection signal generator 314_1A generates the second logical product signal P_JUST having the low level, and the fourth detection signal generator 314_1B generates the fourth logical product signal F_JUST having the low level.

The first OR gate OR1 of FIG. 2 performs an OR operation on the first detection signal EARLY having the low level and the second detection signal JUST having the low level and outputs an OR result having the low level to the first select circuit 226_1. The first select circuit 226_1 of FIG. 10A outputs the low-level output signal of the first OR gate OR1 to the first driver 230_1 depending on the first selection signal TRAIN_ON1 having the high level, and the first driver 230_1 drives the first data output signal DQ[1] having the low level to the delay controller 410 of the memory controller 400 through the components 201_1, 104, 401_1, and 405.

The second select circuit 226_2 of FIG. 10B outputs the second detection signal JUST having the low level to the second driver 230_2 depending on the second selection signal TRAIN_ON2 having the high level, and the second driver 230_2 drives the second data output signal DQ[2] having the low level to the delay controller 410 of the memory controller 400 through the components 201_2, 104, 401_2, and 405.

In response to the first data output signal DQ[1] (=DQ[A]) having the low level and the second data output signal DQ[2] (=DQ[B]) having the low level, the delay controller 410 of FIG. 1 determines that the write training data TP (=00001100) are transferred to the fifth data input/output pin 201_5 after the desired timing (or after a scheduled time), generates the delay control signal DCTL depending on a result a result of the determination, and sends the delay control signal DCTL to the write training data generator 420.

The write training data generator 420 adjusts the timing to send the write training data TP (=00001100) depending on the delay control signal DCTL and again sends the write training data TP (=00001100) to the fifth data input/output pin 201_5 through the components 405, 401_5, and 104.

As described with reference to FIGS. 2, 6 to 8, 10A, 10B, 10C, and 11, until both the first data output signal DQ[1] (=DQ[A]) and the second data output signal DQ[2] (=DQ[B]) are set to the high level, the memory controller 400 adjusts the timing to send the write training data DQ[C] (=DQ[5]=TP=00001100) to be provided to the fifth data input/output pin 201_5 targeted for write training.

Figure 12:
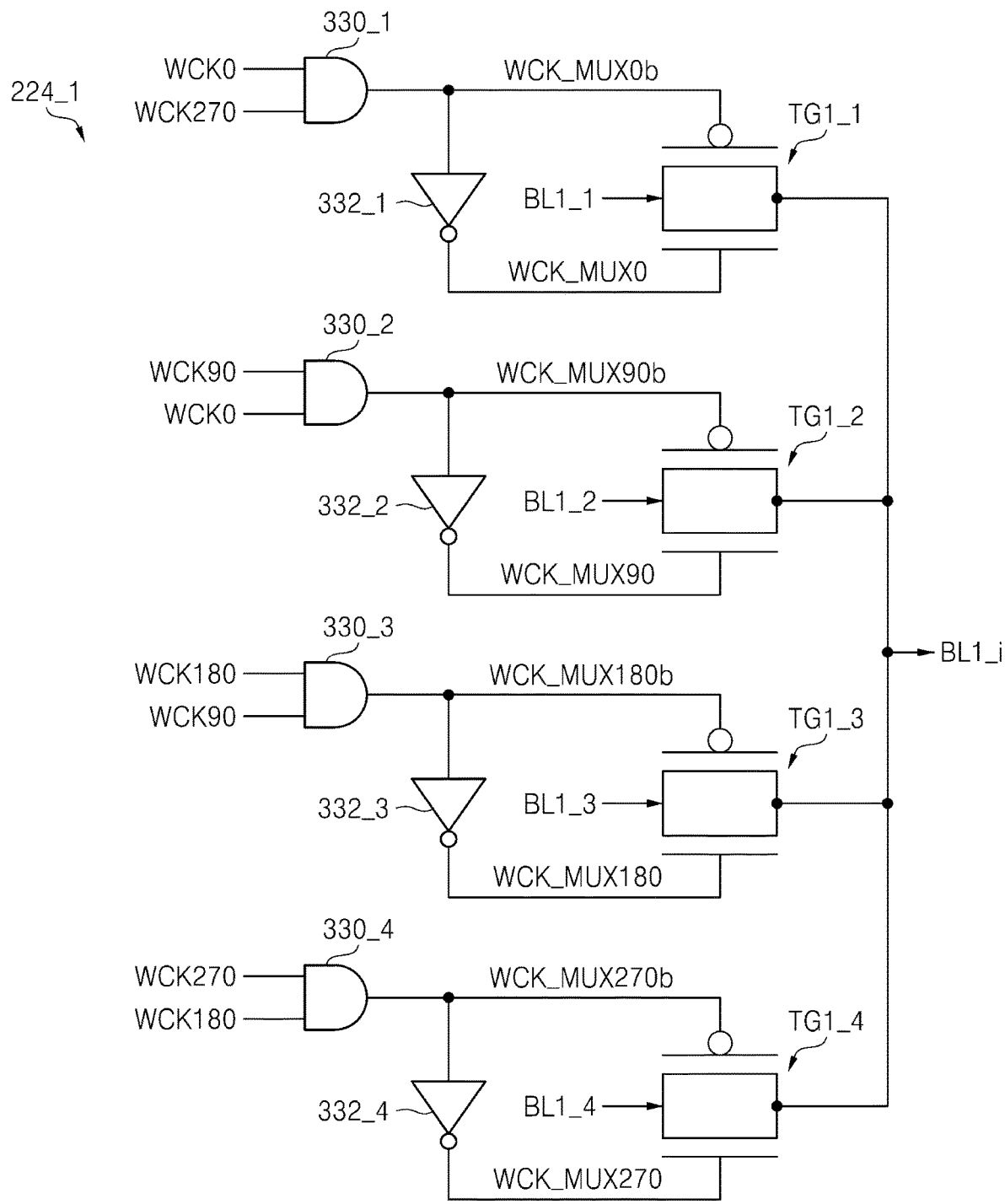
FIG. 12 is a diagram illustrating an embodiment of a data multiplexer illustrated in FIG. 4A to 4C or 10A to 10C.

FIG. 12 is a diagram illustrating an embodiment of a data multiplexer illustrated in FIGS. 4A to 4C or 10A to 10C. Because data multiplexers 224_1 to 224_x respectively included in the data input/output circuits 210_1 to 210_x have the same structure, the structure and operation of the first data multiplexer 224_1 included in the first data input/output circuit 210_1 will be described with reference to FIG. 12.

The first data multiplexer 224_1 includes a plurality of AND gates 330_1, 330_2, 330_3, and 330_4, a plurality of inverters 332_1, 332_2, 332_3, and 332_4, and a plurality of transmission gates TG1_1, TG1_2, TG1_3, and TG1_4. The first AND gate 330_1 performs an AND operation on the first phase sampling write clock signal WCK0 and the fourth phase sampling write clock signal WCK270 to generate a first logical product signal WCK_MUX0b, and the first inverter 332_1 inverts the first logical product signal WCK_MUX0b to generate an inverted first logical product signal WCK_MUX0.

The first transmission gate TG1_1 outputs first data BL1_1 from a first serializer 222_1 to the first select circuit 226_1 depending on the first logical product signal WCK_MUX0b and the inverted first logical product signal WCK_MUX0. The first logical product signal WCK_MUX0b and the inverted first logical product signal WCK_MUX0 may be complementary signals or differential signals.

Because operations of serializers respectively included in the data input/output circuits 210_1 to 210_x are identical, the operation of the first serializer 222_1 will be representatively described. According to embodiments, the first serializer 222_1 may sequentially output 16-bit data DATA1 in units of 4 bits. For example, data DATA1, DATA2, and DATA5 illustrated in FIGS. 4A to 4C may be output from the memory cell array 20 in the read operation.

In the normal operation mode, the first select circuit 226_1 outputs the output signal BL1_1 of the first data multiplexer 224_1 to the first driver 230_1 depending on the first selection signal TRAIN_ON1 having the low level. The first driver 230_1 drives the output signal BL1_1 to the first data input/output circuit 210_1. The second AND gate 330_2 performs an AND operation on the first phase sampling write clock signal WCK0 and the second phase sampling write clock signal WCK90 to generate a second logical product signal WCK_MUX90b, and the second inverter 332_2 inverts the second logical product signal WCK_MUX90b to generate an inverted second logical product signal WCK_MUX90.

The second transmission gate TG1_2 outputs second data BL1_2 from the first serializer 222_1 to the first select circuit 226_1 depending on the second logical product signal WCK_MUX90b and the inverted second logical product signal WCK_MUX90. The second logical product signal WCK_MUX90b and the inverted second logical product signal WCK_MUX90 may be complementary signals or differential signals.

In the normal operation mode, the first select circuit 226_1 outputs the output signal BL1_2 of the first data multiplexer 224_1 to the first driver 230_1 depending on the first selection signal TRAIN_ON1 having the low level. The first driver 230_1 drives the output signal BL1_2 to the first data input/output circuit 210_1.

The third AND gate 330_3 performs an AND operation on the second phase sampling write clock signal WCK90 and the third phase sampling write clock signal WCK180 to generate a third logical product signal WCK_MUX180b, and the third inverter 332_3 inverts the third logical product signal WCK_MUX180b to generate an inverted third logical product signal WCK_MUX180.

The third transmission gate TG1_3 outputs third data BL1_3 from the first serializer 222_1 to the first select circuit 226_1 depending on the third logical product signal WCK_MUX180b and the inverted third logical product signal WCK_MUX180. The third logical product signal WCK_MUX180b and the inverted third logical product signal WCK_MUX180 may be complementary signals or differential signals.

In the normal operation mode, the first select circuit 226_1 outputs the output signal BL1_3 of the first data multiplexer 224_1 to the first driver 230_1 depending on the first selection signal TRAIN_ON1 having the low level. The first driver 230_1 drives the output signal BL1_3 to the first data input/output circuit 210_1.

The fourth AND gate 330_4 performs an AND operation on the third phase sampling write clock signal WCK180 and the fourth phase sampling write clock signal WCK270 to generate a fourth logical product signal WCK_MUX270b, and the fourth inverter 332_4 inverts the fourth logical product signal WCK_MUX270b to generate an inverted fourth logical product signal WCK_MUX270.

The fourth transmission gate TG1_4 outputs fourth data BL1_4 from the first serializer 222_1 to the first select circuit 226_1 depending on the fourth logical product signal WCK_MUX270b and the inverted fourth logical product signal WCK_MUX270. The fourth logical product signal WCK_MUX270b and the inverted fourth logical product signal WCK_MUX270 may be complementary signals or differential signals.

In the normal operation mode, the first select circuit 226_1 outputs the output signal BL1_4 of the first data multiplexer 224_1 to the first driver 230_1 depending on the first selection signal TRAIN_ON1 having the low level. The first driver 230_1 drives the output signal BL1_4 to the first data input/output circuit 210_1.

Figure 13:
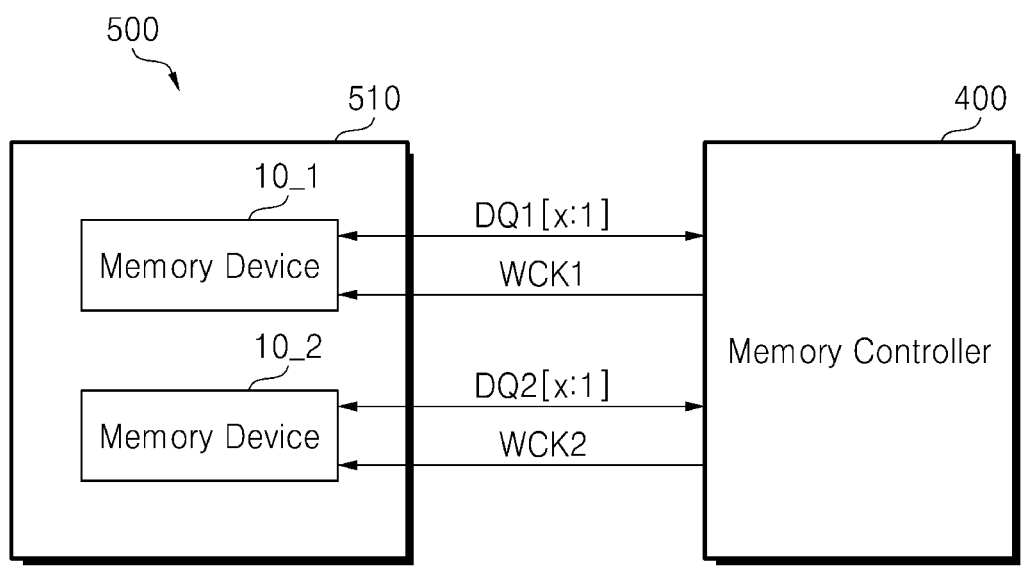
FIG. 13 is a block diagram of a memory system including a plurality of memory devices and a memory controller, according to an embodiment of the present disclosure.

FIG. 13 is a block diagram of a data processing system including a plurality of memory devices and a memory controller, according to an embodiment of the present disclosure. Referring to FIGS. 1 to 13, a data processing system 500 may include a memory system 510 and the memory controller 400. The memory system 510 may include memory devices 10_1 and 10_2. A structure and an operation of each of the memory devices 10_1 and 10_2 are identical to the structure and the operation of the memory device 10 described with reference to FIGS. 1 to 12. Each of the memory devices 10_1 and 10_2 may be implemented with a DRAM, in some embodiments.

The memory controller 400 is configured to supply a first write clock signal WCK1 to the first memory device 10_1, and the first memory device 10_1 is configured to perform write training on any one of the plurality of data input/output pins 201_1 to 201_x included in the input/output interface 200 and to asynchronously send (or feed back) result values of the write training to the memory controller 400 through at least two of the remaining data input/output pins other than the one data input/output pin.

The memory controller 400 supplies a second write clock signal WCK2 to the second memory device 10_2, and the second memory device 10_2 is configured to perform write training on any one of the plurality of data input/output pins 201_1 to 201_x included in the input/output interface 200 and to asynchronously send (or feed back) result values of the write training to the memory controller 400 through at least two of the remaining data input/output pins other than the one data input/output pin.

A semiconductor device according to an embodiment of the present disclosure may perform write training without read training and may asynchronously feed result values of the write training back to a memory controller. Accordingly, the semiconductor device may quickly perform the write training without the read training.

While one or more embodiments of the present disclosure has been described herein, it will be apparent to those of ordinary skill in the art that various changes and modifications may be made thereto without departing from the spirit and scope of the present disclosure as set forth in the following claims.

What is claimed is:

1. A semiconductor device, comprising:
an input/output interface circuit including:
  a first data input/output pin;
  a plurality of second data input/output pins;
  a write clock signal pin configured to receive a write clock signal from a memory controller; and
a sampling circuit configured to generate sampling values by sampling a write training pattern included in write training data for write training using sampling write clock signals that correspond to last M toggling edges of the write clock signal toggling N times, and generate result values of the write training, where N is a natural number greater than M, wherein the first data input/output pin is configured to receive the write training data from the memory controller during a write training operation, and wherein the plurality of second data input/output pins are configured to output feed the result values of the write training generated based on the write clock signal and the write training data, to the memory controller.

2. The semiconductor device of claim 1, wherein when a size of the write training data is W-bits, a value of W is a natural number greater than or equal to 2, and a value of N is a rational number smaller than the W and greater than W−1.

3. The semiconductor device of claim 1, wherein the sampling circuit is configured to:

feed the result values of the write training back to the memory controller through the plurality of second data input/output pins while the write clock signal does not toggle.

4. The semiconductor device of claim 1, wherein the sampling circuit is configured to:

generate the sampling values by sampling the write training pattern using the sampling write clock signals associated with the write clock signal;

generate a first detection signal that indicates whether the write training data are received before a scheduled time, and a second detection signal that indicates whether the write training data are received on schedule, using the sampling values;

feed a logic OR result of the first detection signal and the second detection signal back to the memory controller through one of the plurality of second data input/output pins; and feed the second detection signal back to the memory controller through another one of the plurality of second data input/output pins.

5. The semiconductor device of claim 1, further comprising:

a frequency divider circuit configured to divide a frequency of the write clock signal based on a frequency division ratio, and generate the sampling write clock signals with different phases and a frequency that is divided based on the frequency division ratio;

a first sampling circuit configured to generate the sampling values by sampling the write training pattern in response to each of the sampling write clock signals;

a second sampling circuit configured to generate internal sampling values by respectively sampling the sampling values using one of the sampling write clock signals;

a first detection signal generator configured to generate a first detection signal that indicates whether some of the internal sampling values coincide with first reference values;

a second detection signal generator configured to generate a second detection signal that indicates whether all the internal sampling values coincide with second reference values;

a logic OR gate configured to feed a logic OR result of the first detection signal and the second detection signal back to the memory controller through one of the plurality of second data input/output pins; and a driver circuit configured to feed the second detection signal back to the memory controller through another one of the plurality of second data input/output pins.

6. A memory device, comprising:

a first data input/output pin configured to receive write training data for write training;

a second data input/output pin;

a third data input/output pin;

a write clock signal pin configured to receive a write clock signal; and an input/output interface circuit configured to:

transmit result values of write training performed using the write clock signal and the write training data through the second data input/output pin and the third data input/output pin, generate sampling values by sampling the write training data using sampling write clock signals associated write clock signal;

generate, based on the sampling values, a first detection signal, which indicates whether the write training data are received before a scheduled time, and a second detection signal, which indicates whether the write training data are received on schedule;

send a logic OR result of the first detection signal and the second detection signal to the second data input/output pin; and send the second detection signal to the third data input/output pin.

7. The memory device of claim 6, wherein the input/output interface circuit is configured to:

generate the sampling values by sampling a portion of the write training data using the sampling write clock signals corresponding to last M toggling edges of the write clock signal toggling N times, where N is a natural number greater than M.

8. The memory device of claim 7, wherein, while the write clock signal is not toggling, the input/output interface circuit is configured to send the logic OR result to the second data input/output pin and the second detection signal to the third data input/output pin, respectively.

9. The memory device of claim 6, wherein the input/output interface circuit comprises:

a frequency divider circuit configured to divide a frequency of the write clock signal based on a frequency division ratio, and generate the sampling write clock signals with different phases and a frequency divided based on the frequency division ratio.

10. The memory device of claim 9, wherein the input/output interface circuit further comprises:

a first sampling circuit configured to generate the sampling values by sampling a portion of the write training data in response to the sampling write clock signals, respectively;

a second sampling circuit configured to generate internal sampling values by respectively sampling the sampling values using one of the sampling write clock signals;

a first detection signal generator circuit configured to generate the first detection signal, which indicates whether some of the internal sampling values coincide with first reference values;

a second detection signal generator circuit configured to generate the second detection signal, which indicates whether all the internal sampling values coincide with second reference values;

a logic OR gate configured to send the logic OR result of the first detection signal and the second detection signal to the second data input/output pin; and a driver circuit configured to send the second detection signal to the third data input/output pin.

11. The memory device of claim 10, wherein the input/output interface circuit further comprises:

a first mode register set configured to store first data, which indicates whether to enter a write training mode for the write training;

a first select circuit configured to send the logic OR result to the second data input/output pin based on a first selection signal generated by the first data stored in the first mode register set;

a second mode register set configured to store second data, which indicates whether to enter the write training mode; and a second select circuit configured to send the second detection signal to the third data input/output pin based on a second selection signal generated by the second data stored in the second mode register set.

12. The memory device of claim 6, wherein the memory device is a low-power double data rate synchronous dynamic random access memory (LPDDR SDRAM).

13. A memory system, comprising:
a memory device; and
a memory controller configured to send a write clock signal and write training data for write training to the memory device;
wherein the memory device includes:
  a first data input/output pin configured to receive the write training data;
  a second data input/output pin;
  a third data input/output pin;
  a write clock signal pin configured to receive the write clock signal; and
  an input/output interface circuit configured to:
    feed result values of the write training, which is performed using the write clock signal and the write training data, back to the memory controller through the second data input/output pin and the third data input/output pin;
    generate sampling values by sampling the write training data using sampling write clock signals associated write clock signal;
    generate a first detection signal, which indicates whether the write training data are received before a scheduled time, and a second detection signal, which indicates whether the write training data are received on schedule, using the sampling values;
    feed a logic OR result of the first detection signal and the second detection signal back to the memory controller through the second data input/output pin; and
    feed the second detection signal back to the memory controller through the third data input/output pin.

14. The memory system of claim 13,
wherein the memory controller generates the write clock signal toggling N times and sends the write clock signal to the write clock signal pin; and
wherein the input/output interface circuit is configured to generate the sampling values by sampling a portion of the write training data using the sampling write clock signals corresponding to last M toggling edges of the write clock signal toggling N times, where N is a natural number greater than M.

15. The memory system of claim 13, wherein, while the write clock signal does not toggle, the input/output interface circuit is configured to feed the logic OR result back to the memory controller through the second data input/output pin, and feed the second detection signal back to the memory controller through the third data input/output pin.

16. The memory system of claim 15, wherein the memory controller comprises:
a delay controller configured to receive the logic OR result and the second detection signal, and generate a delay control signal based on the logic OR result and the second detection signal; and
a write training data generator circuit configured to adjust a timing to send the write training data based on the delay control signal, and send the write training data at the adjusted timing through the first data input/output pin.

17. The memory system of claim 15, wherein the input/output interface circuit comprises:
a frequency divider circuit configured to divide a frequency of the write clock signal depending on a frequency division ratio, and generate the sampling write clock signals having different phases and a frequency divided based on the frequency division ratio;
a first sampling circuit configured to generate the sampling values by sampling a portion of the write training data in response to the sampling write clock signals, respectively;
a second sampling circuit configured to generate internal sampling values by respectively sampling the sampling values using one of the sampling write clock signals;
a first detection signal generator circuit configured to generate the first detection signal, which indicates whether some of the internal sampling values coincide with first reference values;
a second detection signal generator circuit configured to generate the second detection signal, which indicates whether all the internal sampling values coincide with second reference values;
a logic OR gate configured to send the logic OR result of the first detection signal and the second detection signal to the second data input/output pin; and
a driver circuit configured to send the second detection signal to the third data input/output pin.

* * * * *